US008276739B2

(12) United States Patent
Bastian, II et al.

(10) Patent No.: US 8,276,739 B2
(45) Date of Patent: Oct. 2, 2012

(54) THREE-DIMENSIONAL AUTOMATED PICK MODULE

(75) Inventors: William A. Bastian, II, Carmel, IN (US); Elizabeth Sobota, Greenfield, IN (US)

(73) Assignee: Bastian Material Handling, LLC, Indianapolis, IN (US)

(*) Notice: Subject to any disclaimer, the term of this patent is extended or adjusted under 35 U.S.C. 154(b) by 883 days.

(21) Appl. No.: 11/626,869

(22) Filed: Jan. 25, 2007

(65) Prior Publication Data

US 2008/0181753 A1    Jul. 31, 2008

(51) Int. Cl.
B65G 1/137    (2006.01)

(52) U.S. Cl. .................. 198/347.1; 414/277; 414/267; 414/807; 901/30

(58) Field of Classification Search ............ 198/347.1; 414/267
See application file for complete search history.

(56) References Cited

U.S. PATENT DOCUMENTS

| 2,873,033 | A |   | 2/1959  | Mapstone         |
|-----------|---|---|---------|------------------|
| 3,687,312 | A |   | 8/1972  | Weir             |
| 4,159,696 | A | * | 7/1979  | Martin ........... 119/337 |
| 4,212,385 | A | * | 7/1980  | Leach ........... 198/781.08 |
| 4,236,862 | A |   | 12/1980 | McCormick        |
| 4,720,228 | A |   | 1/1988  | Horiguchi et al. |
| 5,174,707 | A |   | 12/1992 | Suekane et al.   |
| 5,226,782 | A | * | 7/1993  | Rigling ........... 414/283 |
| 5,328,316 | A |   | 7/1994  | Hoffmann         |
| 5,336,042 | A |   | 8/1994  | Winski           |
| 5,478,183 | A |   | 12/1995 | Savigny          |
| 5,564,890 | A |   | 10/1996 | Knudsen, Jr.     |
| 5,582,497 | A |   | 12/1996 | Noguchi          |
| 5,826,699 | A | * | 10/1998 | Trauten ........... 198/463.3 |
| 5,863,172 | A | * | 1/1999  | Pearson et al. ........... 414/331.03 |
| 5,953,234 | A |   | 9/1999  | Singer et al.    |
| 5,955,857 | A | * | 9/1999  | Kwon et al. ........... 318/568.11 |
| 6,061,607 | A |   | 5/2000  | Bradley et al.   |
| 6,377,867 | B1| * | 4/2002  | Bradley et al. ........... 700/216 |

(Continued)

FOREIGN PATENT DOCUMENTS

DE    39 41 754 A1    6/1991

(Continued)

OTHER PUBLICATIONS

Adept Technology, Inc., Adept Cobra s800 Inverted, http://www.adept.com/products/details.asp, 2000-2006.

(Continued)

*Primary Examiner* — Kavel Singh
(74) *Attorney, Agent, or Firm* — Woodard, Emhardt, Moriarty, McNett & Henry LLP

(57) ABSTRACT

Individual items or multiple items are stored on vertical stacks (or racks) of conveyors. The stacks of conveyors are located on both sides of a vertical transport on which cartons, totes, and/or pallets are loaded. The vertical transport is able to be vertically lifted in a fashion similar to an elevator so that the totes on the conveyor can receive items from the various levels of the storage rack conveyors. To speed up the loading process, items can be loaded in the containers simultaneously from both sides of the container and/or sequentially. In one form, a cross-belt conveyor is used to load the items. Alternatively or additionally, robotic arms can be used to load the items. One or more conveyor drivers can be used to power multiple conveyors in order to index items to a loading position on the conveyors.

33 Claims, 26 Drawing Sheets

U.S. PATENT DOCUMENTS

| | | | |
|---|---|---|---|
| 6,425,226 | B1 | 7/2002 | Kirschner |
| 6,695,569 | B2 | 2/2004 | Hofer |
| 6,824,345 | B2 | 11/2004 | Hansl et al. |
| 6,929,440 | B1 | 8/2005 | Grond |

FOREIGN PATENT DOCUMENTS

| | | |
|---|---|---|
| DE | 40 31 883 A1 | 4/1992 |
| DE | 198 48 274 A1 | 5/2000 |
| JP | H06-115632 A | 4/1994 |
| JP | H08-113314 A | 5/1996 |
| KR | 10-0666966 B1 | 1/2007 |

OTHER PUBLICATIONS

Daifuku Co Ltd., Mini Load Automated Buffer, http://www.daifukuamerica.com/daifuku/dac/fada/f_mlab_1.asp, 1998-2006.

GBI Data and Sorting Systems, Cross-Belt Sorter, http://www.gbisorters.com/cross-belt.vgm, 2002-2006.

GBI Data and Sorting Systems, Mail Sorter, http://www.gbisorters.com/mail-sorter.cfm, 2002-2006.

HK Systems, Inc., Automated Storage and Retrieval Machines, http://www.hksystems.com/automated-storage-and-retrieval/index.cfm, 2006.

MHE Taxonomy, CIC/MHE Material Handling Equipment, http://www.ise.ncsu.edu/kay/mhetax/TransEq/Conv/index.html, Sep. 30, 1999.

SSI Schaefer, Innovation You Can Handle, http://www.ssi-schaefer.ca/ASRS, 2001.

TGW Ermanco, TGW Ermanco—The Premier Material Handling Technology Source: Innovation. Expertise. Services, Product Brochure, 2006.

Wikipedia, Industrial robot, http://en.wikipedia.org/wiki/Industrial_robot, Dec. 28, 2006.

International Patent Application No. PCT/US2008/50501 International Search Report and Written Opinion mailed Sep. 2, 2008.

DE 198 48 274 A1 to Siemens AG—Machine Translation.

DE 39 41 754 A1 to Fraunhofer Ges Forschung—Machine Translation.

DE 40 31 883 A1 to Koettgen Gmbh & Co. KG—Machine Translation.

EP 08 71 3646 European Search Report Jan. 20, 2011.

International Patent Application No. PCT/US2011/026570 International Search Report and Written Opinion mailed Nov. 7, 2011.

* cited by examiner

THREE-DIMENSIONAL AUTOMATED PICK MODULE

BACKGROUND

The present invention generally relates to material handling systems and more specifically, but not exclusively, concerns a three-dimensional material handling system as well as techniques for utilizing the system.

Picking products in distribution centers for order fulfillment has historically been one of the most labor intensive processes. The picking activities are monotonous for human operators. This leads to quality issues (like mis-picks), high employee turnover, and inconsistent productivity. Moreover, some environments can be unpleasant or even hazardous to human operators, such as commercial freezers that are used to store food. Turnaround time for both warehousing and removal is still yet another concern. The quicker that goods can be processed and loaded onto trucks, trains, or other transports, the larger geographical area a distribution center can service. For example, the quicker a truck can be loaded and unloaded, the larger a service territory the distribution center is able to service because the truck can cover a greater distance in the same amount of time. Another ongoing issue for product distribution systems is product warehouse space. As the cost of real estate continues to increase, minimizing the footprint of the warehouse becomes an even greater concern.

Most warehouses only utilize a fraction of their available vertical space due to many factors, including the limited range to access items stored at higher levels. Three dimensional rack systems in the form of Automated Storage and Retrieval Systems (often referred to as ASRS or AS/RS) have been proposed that store items on vertical storage racks. However, these vertical systems have several significant commercial drawbacks. As one example, throughput is always a concern for these vertical systems because moving the additional vertical dimension can increase retrieval times. In other words, retrieving items from the racks in a quick and efficient manner has been a constraint in most proposed systems. Moving items in the racks to a position where they can be retrieved has also been a concern. To address this issue, the racks are typically very narrow and usually are designed to store one or two pallets or cartons at most. Thus, the capacity for a given rack is significantly reduced, which in turn reduces the storage space utilization or efficiency. In addition, the technological complexity of these systems tends to cause significant downtime as well as increased maintenance expenses. Due to the complex and automated nature of typical ASRS implementations, these systems tended to be rigid as to how the items are handled and the types that can utilize the systems. Such systems typically are only able to handle pallets or cases with fixed dimensions, which in turn limits their flexibility.

Generally speaking, items from the racks can be fed either using a gravity feed or powered system. An example of a gravity feed system is what is termed an "A-frame" type storage rack. Typically, A-frame racks store items that are light and not easily crushed like pharmaceutical products. While useful in limited situations, A-frames cannot be used with larger items and/or fragile items, such as electronics, food, etc. On the other hand, powered systems can store larger items on generally flat conveyor belts. Given that the conveyors are generally flat, the items can be spaced apart so as to avoid damage caused by items knocking into one another. However, powered rack systems are not economically practical because of the large number of motors required for each conveyor in the stack. Conveyor motors are expensive, and each level in a vertical stack can include multiple separate conveyors that are individually operated by the conveyor motor. As should be recognized, the costs associated with the conveyor motors multiplies as the number of stack levels increases. Moreover, with the large number of motors involved, the risk of at least one of the motors failing increases. In addition, ancillary expenses, like performing routine preventive maintenance on the motors, can make such systems cost prohibitive.

Thus, there is a need for improvement in this field.

SUMMARY

One aspect of the present invention concerns a storage system. The storage system includes at least two storage racks disposed in an opposing manner. The storage racks each include two or more levels that have one or more rack conveyors upon which items are stored. A vertical transport is disposed between the storage racks, and the vertical transport includes one or more robotic arms that are secured to the vertical transport to move vertically in unison with the vertical transport. An elevator is configured to move the vertical transport vertically between the levels so that the robotic arms are able to load the items from the rack conveyors onto the vertical transport.

Another aspect concerns a storage system that includes a storage rack. The storage rack includes two or more rack conveyors upon which items are stored. A conveyor driver is configured to move along the storage rack to power the two or more rack conveyors.

Still yet another aspect concerns a storage system that includes at least two storage racks. The storage racks are disposed in an opposing manner, and the storage racks each include two or more levels that have one or more rack conveyors upon which items are stored. A vertical transport is disposed between the storage racks. The vertical transport includes a cross-belt conveyor configured to load the items from the rack conveyors onto the vertical transport. An elevator is configured to move the vertical transport vertically between the levels.

A further aspect concerns a technique in which a vertical transport is raised in a vertical direction to a first vertical position along a storage rack that has a first level with a first rack conveyor. One or more first items from the first rack conveyor at the first level are loaded onto the vertical transport. One or more second items are loaded onto the vertical transport from a second rack conveyor that is located at a second level that is different from the first level while the vertical transport remains at the first vertical position.

Yet another aspect concerns a technique in which a first conveyor is powered with a conveyor driver to index a first item on the first conveyor to a first loading position. The conveyor driver is moved to a second conveyor. The second conveyor is powered with the conveyor driver to index a second item on the second conveyor to a second loading position.

Further forms, objects, features, aspects, benefits, advantages, and embodiments of the present invention will become apparent from a detailed description and drawings provided herewith.

DESCRIPTION OF SELECTED EMBODIMENTS

Figure 1:
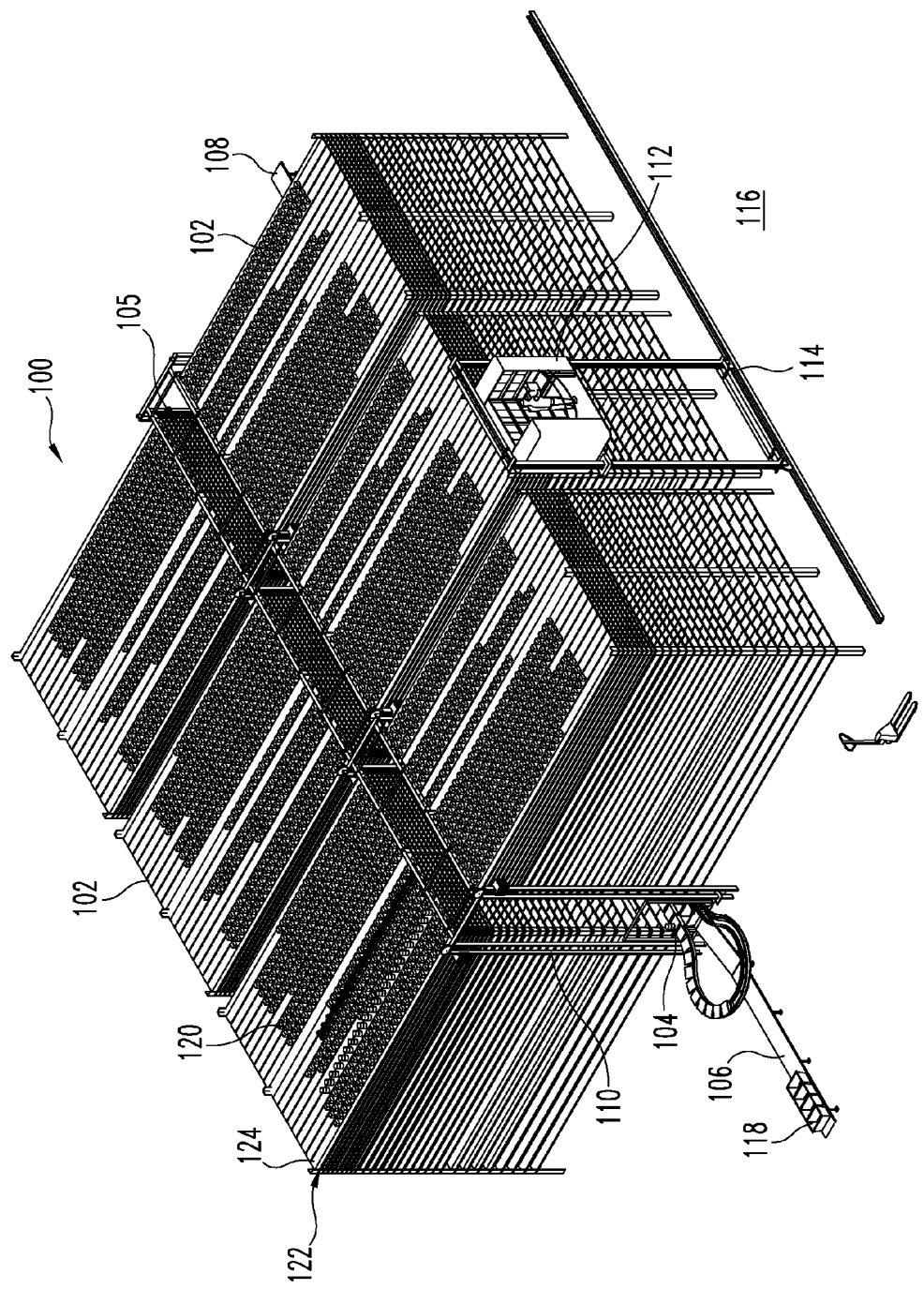
FIG. 1 is perspective view of a three-dimensional storage system according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some common features that are not relevant to the present invention may not be shown for the sake of clarity.

For the convenience of the reader, it should be initially noted that the drawing in which an element is first introduced is typically indicated by the left-most digit(s) in the corresponding reference number. For example, a component identified with a one-hundred series reference number (e.g., 100, 101, 102, 103, etc.) will usually be first discussed with reference to FIG. 1, and a component with a two-hundred series reference number (e.g., 200, 201, 202, 203, etc.) will usually be first discussed with reference to FIG. 2.

The present invention generally concerns a three-dimensional storage system. Individual items or multiple items in a container are stored on vertical stacks (or racks) of conveyors. In comparison to traditional A-frame storage racks, the rack conveyors can store larger items or containers because the items are stored in a generally flat, untouching manner, which minimizes damage. Products or items to be picked do not have to be stackable like in an A-frame. The stacks of conveyors are located on both sides of a vertical transport on which cartons or totes are loaded. The vertical transport is able to be vertically lifted in a fashion similar to an elevator so that the totes on the conveyor can receive items from the various levels of the storage rack conveyors. To speed up the loading process, items can be loaded in the containers simultaneously from both sides of the container and/or sequentially.

In one embodiment, a cross-belt conveyor system surrounds the vertical transport, and the cross-belt conveyor system is coupled to the elevator portion of the vertical transport so that the cross-belt conveyor system moves vertically in unison with the vertical transport. The cross-belt conveyor system includes a number of discrete conveyor belts that are able to individually or collectively convey items. The individual conveyor belt sections in the cross-belt conveyor system are able to move or rotate around the vertical transport. The cross-belt conveyor system allows multiple rack positions to be unloaded simultaneously as well as allows the totes to be filled simultaneously from two or more sides. Robotic arms can be coupled to the elevator for moving larger items and/or clearing jams in the system. In another embodiment, the cross-belt conveyor system is eliminated, and the robotic arms are used to load/unload items from the various racks and totes. With this system, the cross belt conveyor and robotic arms allow items to be picked or placed at a rate that is up to 4 or 5 times that of a human operator with nearly 100% accuracy. Operations cost are significantly reduced because of the elimination of human pickers.

To reduce the number of conveyor motors required, the individual conveyors in the racks do not have dedicated conveyor motors. Rather, individual conveyor drive motors are moved in position to actuate the rack conveyors on an as-needed basis. In one embodiment, the conveyor drive motors are able to slide or otherwise move longitudinally along both sides of the vertical transport to individually power the rack conveyors on the rack level at which the vertical transport is presently located. As the vertical transport moves vertically, the conveyor drive motors move vertically in unison with the vertical transport in order to power conveyors on the next level. In another embodiment, the conveyor drive motors are able to move vertically independent of the vertical transport. In still yet another variation, the drive motors do not move vertically, but rather, the system has one or more drive motors that are dedicated to power the conveyors on each rack level. A hybrid system is also contemplated in which selected conveyors, such as those having heavier loads, have dedicated conveyor drive motors, and other conveyors share a common conveyor drive motor.

Figure 2:
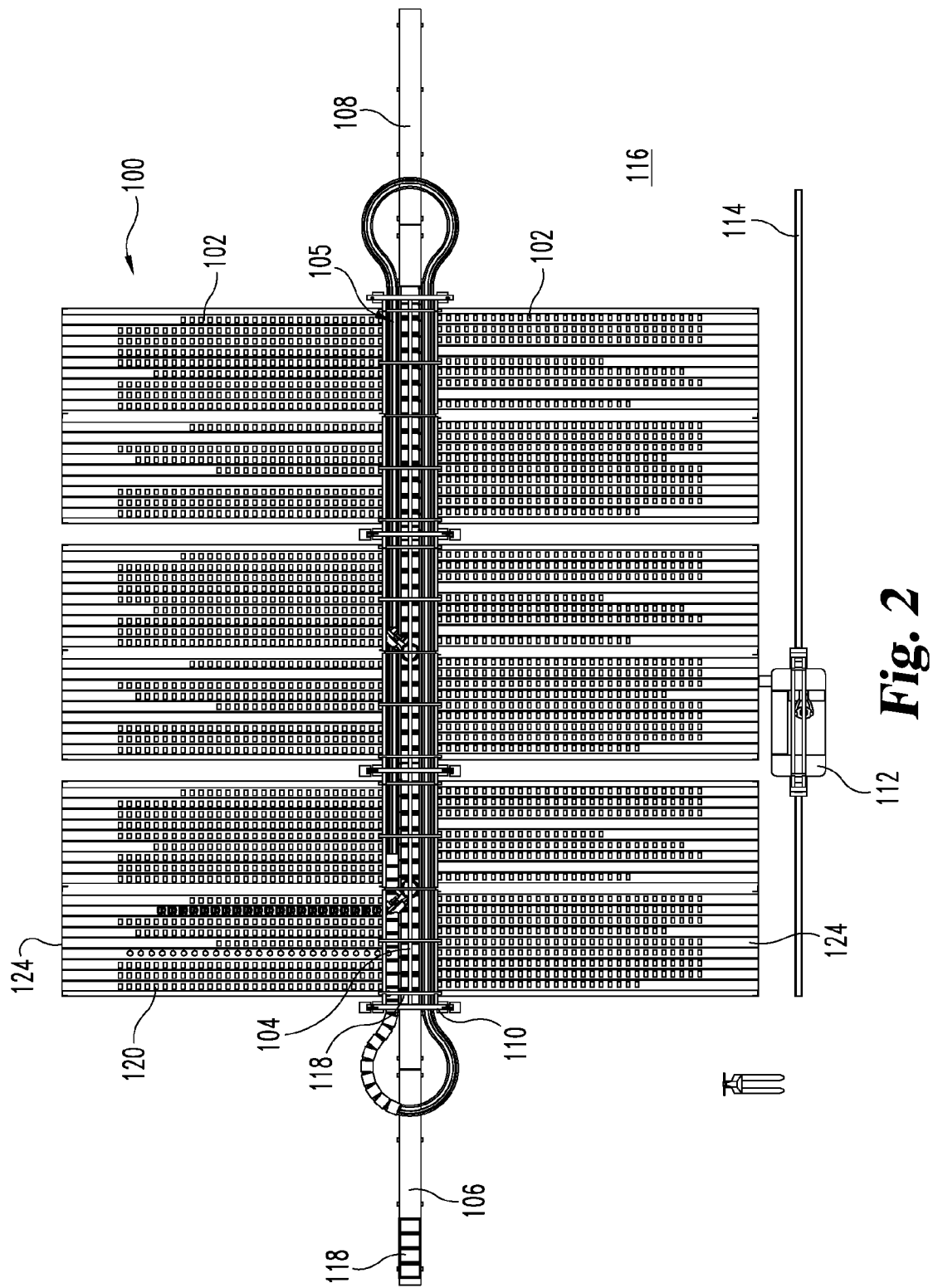
FIG. 2 is a top plan view of the FIG. 1 system.
Figure 3:
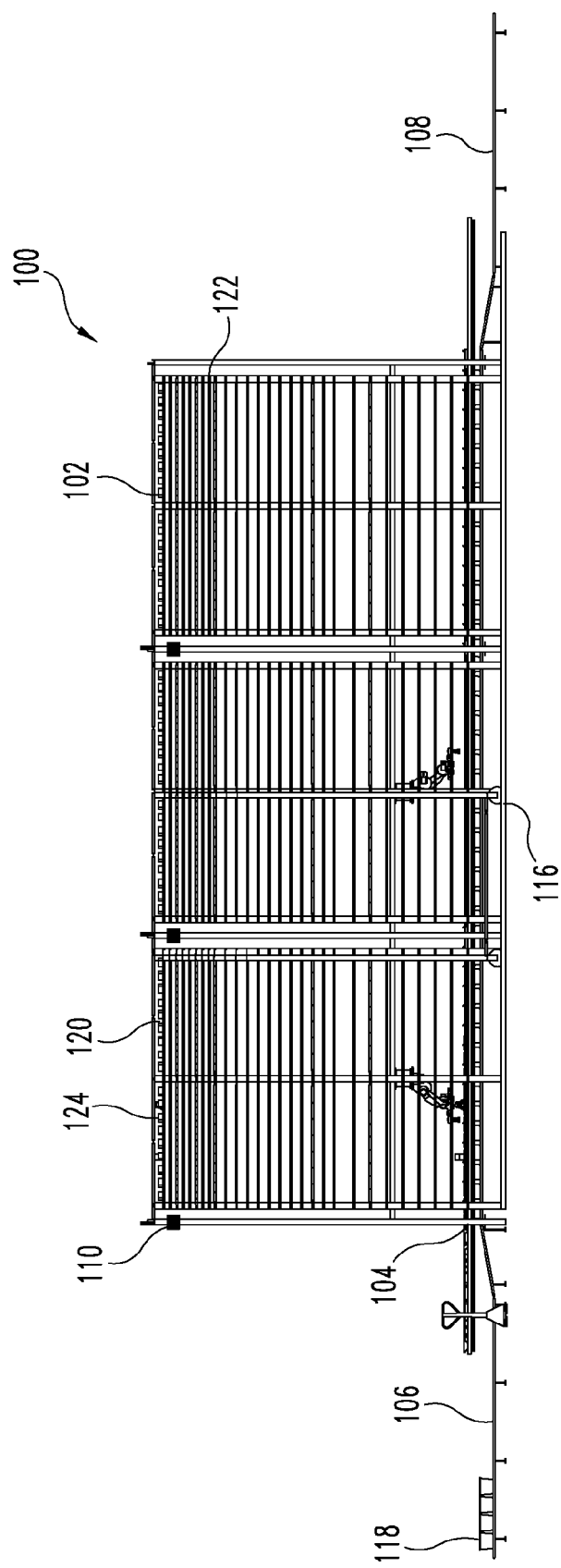
FIG. 3 is a side view of the FIG. 1 system.
Figure 4:
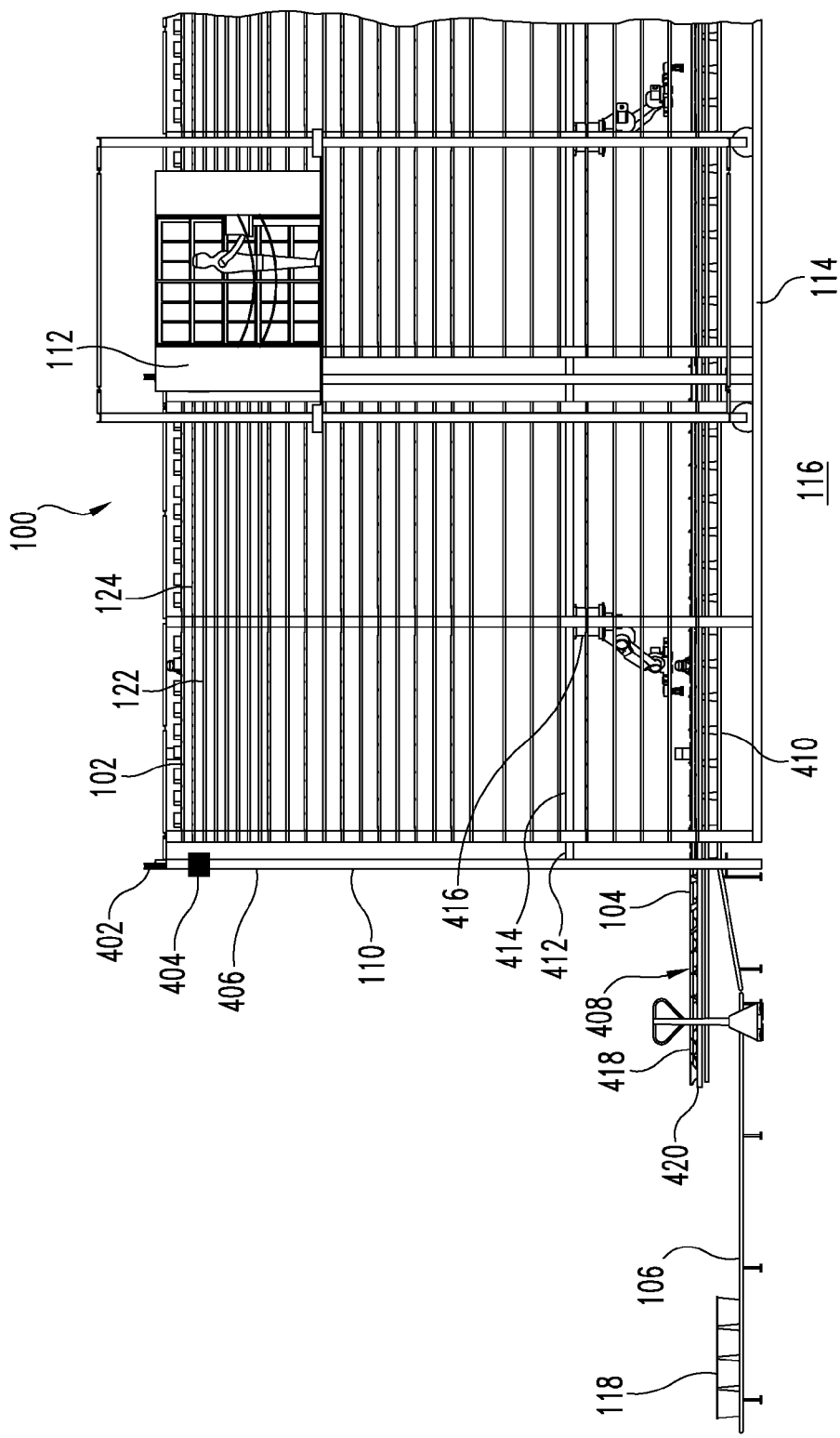
FIG. 4 is an enlarged side view of the FIG. 1 system.
Figure 5:
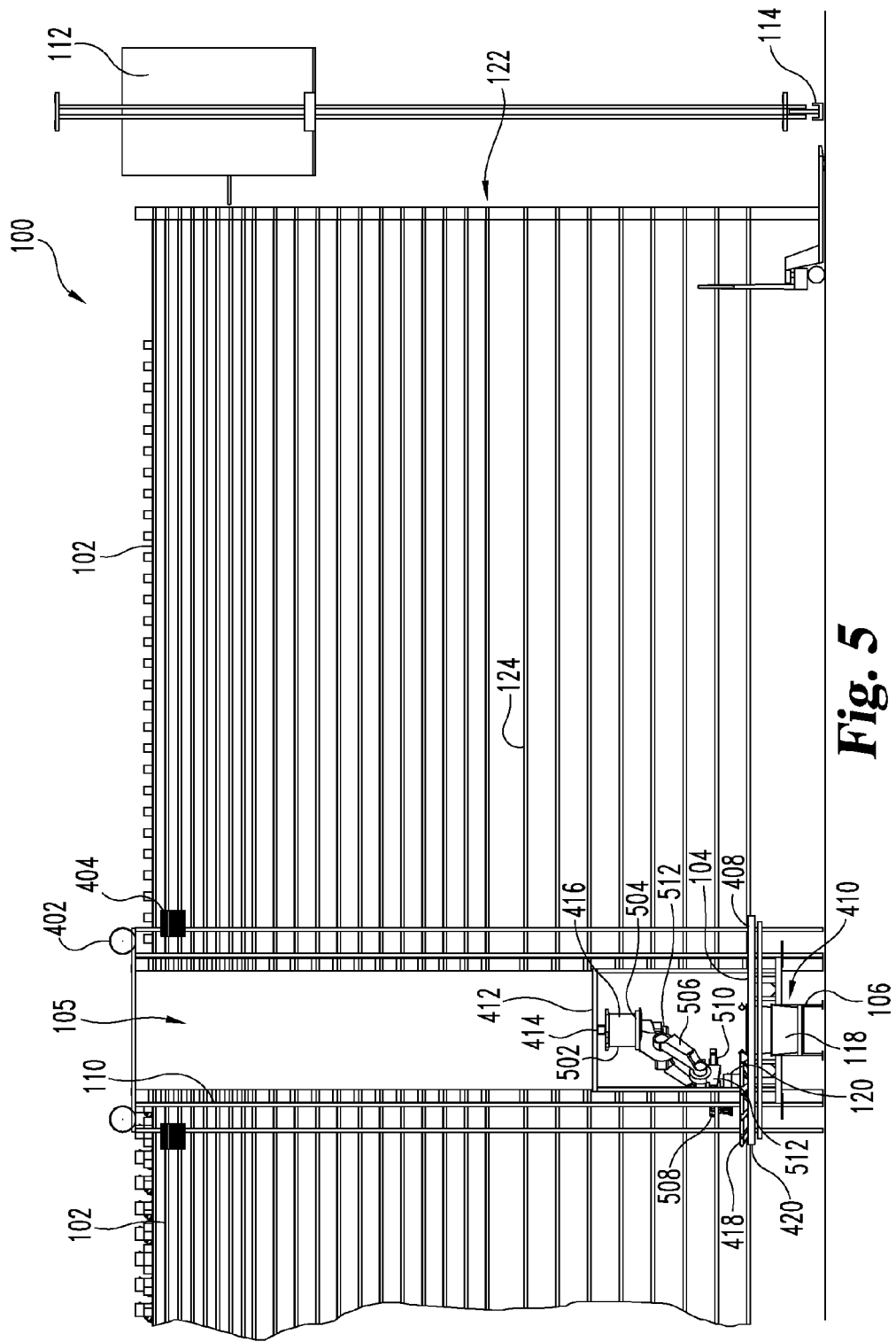
FIG. 5 is a front-end view of the FIG. 1 system.

A three-dimensional storage system 100 according to one embodiment (among many) of the present invention will be initially described with reference to FIGS. 1, 2, 3, 4 and 5. As can be seen, FIG. 1 illustrates a perspective view of the system 100, and FIG. 2 shows a top plan view of the system 100. FIG. 3 shows a full side view of the system 100. FIG. 4 illustrates an enlarged side view of the system 100, and FIG. 5 depicts a front view of the system 100.

Looking at FIG. 1, the system 100 includes a series of conveyors in vertical racks 102 positioned on opposite sides of a centrally located vertical transport or carrier 104. The racks 102 form an aisle 105 in which the vertical transport 104 is able to vertically move. In the illustrated embodiment, incoming 106 and outgoing 108 conveyors are positioned at opposite ends of the vertical transport 104. An elevator 110 is configured to vertically move the vertical transport 104 in the aisle 105 between the racks 102. The system 100 further includes a replenishment station 112 in which an operator replenishes the racks 102. The replenishment station 112 in the illustrated embodiment is configured to roll horizontally along a guide rail 114 on a floor 116 as well as vertically so as to replenish the racks 102. As will be explained below, the racks 102 can be replenished in other manners, such as via the vertical transport 104.

Figure 27:
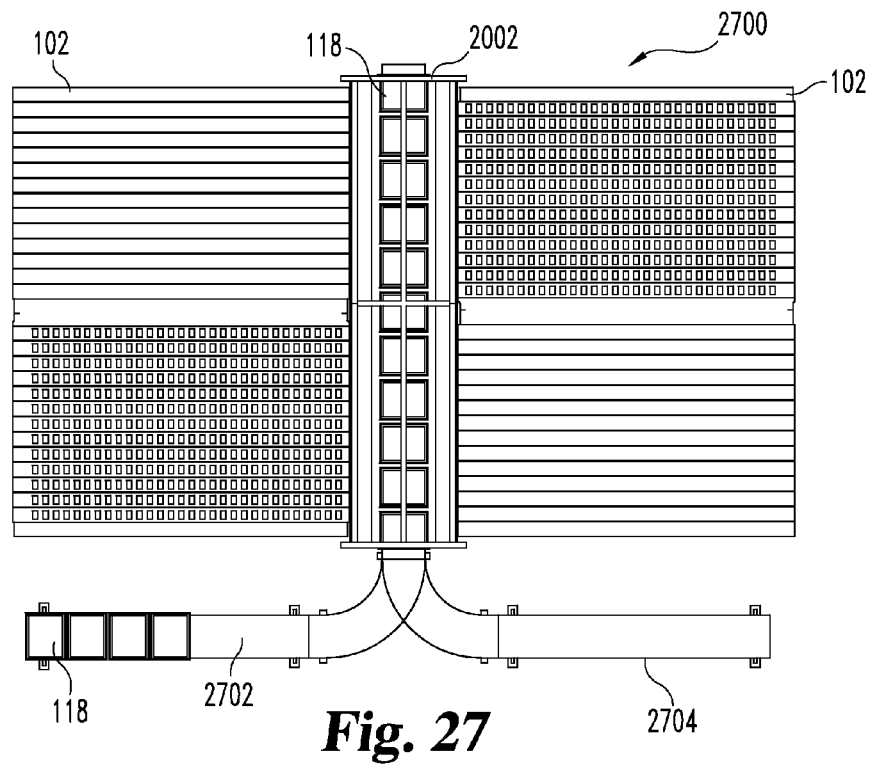
FIG. 27 is a top plan view of a three-dimensional storage system according to another embodiment.

The incoming conveyor 106 supplies totes, cartons, pallets, and/or other types of containers 118 to the vertical transport 104. Once a sufficient number of totes 118 are loaded, the elevator 110 raises the vertical transport 104 to one or more levels of the racks 102 where items 120, which are commonly called stock keeping units (SKUs), are loaded into the totes 118. Additional dunnage, slip sheets, and/or other packing materials and paperwork can be placed within the tote 118 as well. The items or SKUs 120 on the racks 102 can include individual products or a collection of products grouped together, such as in a box. Once the totes 118 are filled with the required items 120 to fulfill their respective orders, the elevator 110 lowers the vertical transport 104 towards the floor 116 such that the totes 118 can be unloaded onto the outgoing conveyor 108. In the illustrated embodiment, the incoming 106 and outgoing 108 conveyors are located on opposite ends of the vertical transport 104, but these conveyors can be configured in different manners. As one example, the incoming 106 and outgoing 108 conveyors can be located on the same side of the vertical transport 104 (FIG. 27). In another example, the functions of the incoming 106 and outgoing 108 conveyors are combined into a single conveyor or conveyor spur that handles both loading and unloading of the totes 118 from the vertical transport 104. Although the conveyors illustrated in the drawings are belt conveyors, it should be recognized that other types of conveyors can be used like roller, bucket, chain, and cart-on-track conveyors, to name just a few examples. In the illustrated embodiment, the totes 118 are oriented in a single line or column configuration, but in other embodiments, the totes 118 can be oriented in a side-by-side or multiple column orientation so as to increase the density of totes 118.

With reference to FIGS. 1, 2, and 3, each rack 102 has one or more vertical levels 122 on which the items 120 are stored. The various levels 122 can be evenly spaced or unevenly spaced. In the embodiment depicted in FIG. 1, the vertical spacing between the levels 122 decreases at the higher levels. This allows the larger or bulkier items 120, which are presumably heavier, to be stored closer to the floor 116, and the smaller, presumably lighter items 120 to be stored near the top of the racks 102. This configuration helps to conserve energy because less energy is required to move the heavier items 120 to and from the lower levels 122. In addition, safety is improved because the heavier items are stored at the less dangerous lower levels 122. As can be seen, each level 122 has one or more rack conveyors 124 that are independently moveable with respect to one another. Although the rack conveyors 124 illustrated in the drawings are belt conveyors, it should be recognized that other types of conveyors can be used like roller conveyors, etc. The rack conveyors 124 are generally flat or level with respect to the floor 116, but it is contemplated that the rack conveyors 124 can be slightly or significantly inclined, if so desired.

Figure 11:
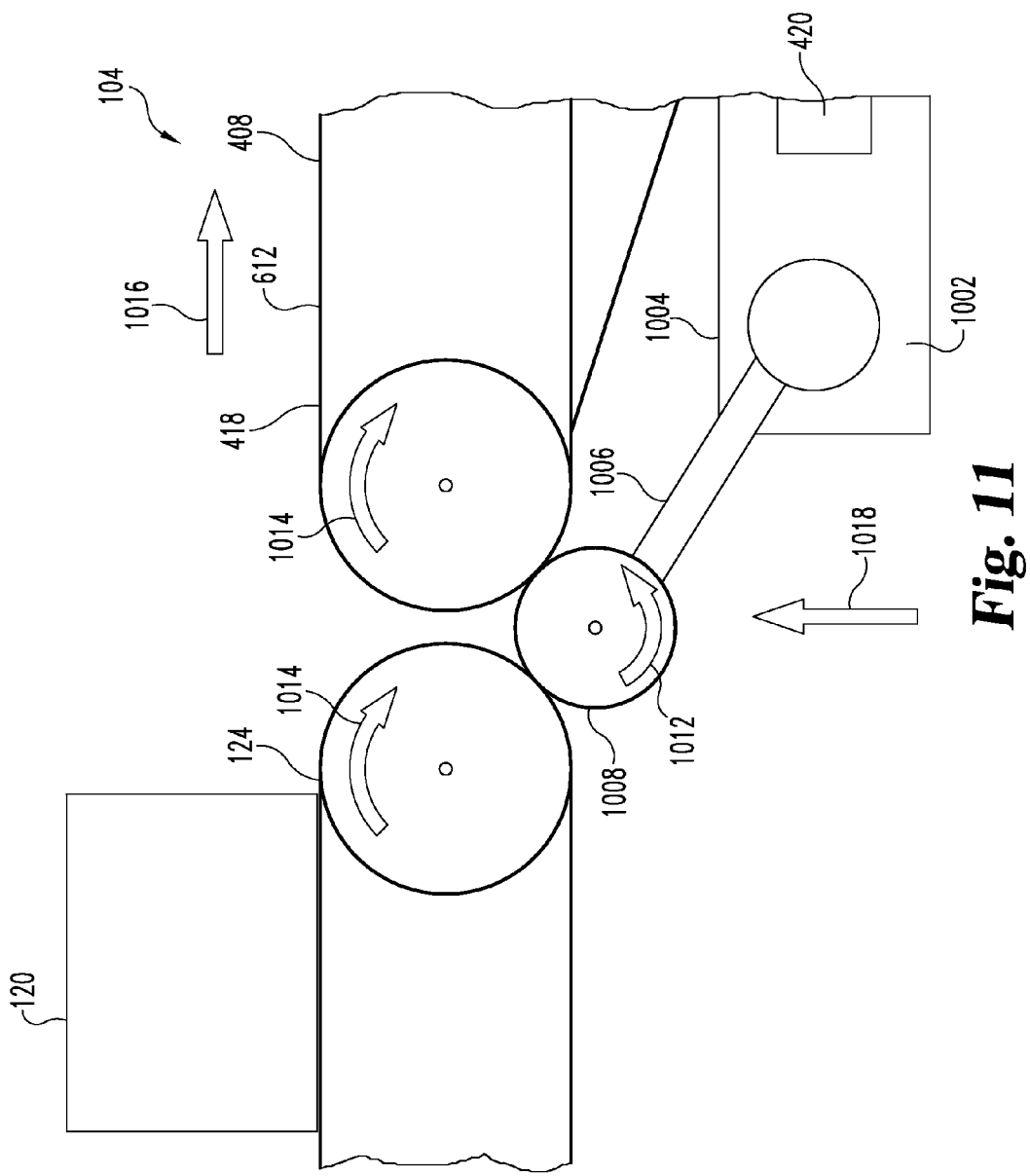
FIG. 11 is an enlarged side view of a second example of how rack conveyors can be powered by a conveyor driver in the FIG. 1 system.

The rack conveyors 124 in the depicted embodiment are not self-powered. That is, the rack conveyors 124 do not each have a motor that powers the rack conveyor 124. As noted before, the racks 102 in other embodiments can have a hybrid system in which some of the rack conveyors 124 are self-powered, while others are not. Moreover, as will be appreciated, selected features of the system 102 can be incorporated into other designs in which all of the rack conveyors 124 are self-powered. Nevertheless, as mentioned before, having the rack conveyors 124 powered by an independent outside source reduces the number of conveyor motors required for the system 102. Looking at FIG. 1, it should be recognized hundreds of conveyor motors would be needed if each rack conveyor 124 required a motor. As will be recognized, the number of conveyor motors can be less than ten, or even zero (as is depicted in FIG. 11), in the FIG. 1 system 100. This significant reduction in the number of conveyor motors reduces the cost of the overall system as well as operating expense. For example, expensive wiring and controls for the conveyor motors can be eliminated from the racks 102. It should be noted that more or less conveyor motors can be used than the number of motors described or illustrated herein.

Looking at FIGS. 4 and 5, the elevator 110 for vertically moving the vertical transport 104 in the depicted embodiment is a traction type elevator that includes one or more pulleys 402, counterweights 404, and motors mounted to an elevator support structure 406. Cables on the pulleys 402 are attached to the vertical transport 104, and the motors along with the counterweights 404 move the vertical transport 104 via the cables. It should be recognized that other types of elevators can be used. For instance, the elevator 110 in other embodiments can include servo motors, linear induction systems, and/or hydraulic, electromagnetic, and/or climbing elevators, to name just a few types.

The vertical transport 104 in FIG. 4 includes a cross-belt conveyor 408, a lower transport conveyor 410, a support frame 412 with a guide rail 414, and one or more robotic arms (or robots) 416 hanging from the guide rail 414 that are configured to move along the guide rail 414. The robotic arms 416 have been proven to provide high reliability. In one example, the robotic arm 416 is in the form of an industrial robot, but it should be recognized that other types of robots can be used. For instance, the robotic arm 416 in one embodiment is made from a composite material, aluminum, and/or other light materials in order to reduce mass, which in turn provides quicker acceleration and deceleration. In one particular example, the robotic arm 416 is a high speed inverted robot, such as an Adept Cobra™ s800 Inverted Selective Compliant Articulated/Assembly Robot Arm (SCARA) robot supplied by Adept Technology, Inc. Of course, other types of robots can be used like six-axis heavy-duty industrial robots. The robotic arm 416 can be powered in any number of manners, such as via electrical motors, pneumatic actuators, and/or hydraulic actuators. The cross-belt conveyor 408 is used to transfer items 120 from the storage racks 102 to the totes 118 (or vice-versa). The cross-belt conveyor 408 includes individual carriages 418 linked together that are moveable along a carriage track or rail 420. In the illustrated embodiment, the carriages 418 are linked together to form a continuous, endless loop, but in other embodiments, a number of carriages 418 can be grouped together to form several trains that simultaneously run along the track 420 in an asynchronous manner. For example, the cross-belt conveyor 408 in another embodiment has two trains of carriages 418 located on opposite sides of the totes 118. The two separate trains are configured to move independently of one another in order to speed processing.

Looking at FIG. 5, by hanging on the guide rail 414, the robotic arms 416 are able to longitudinally move above the cross-belt conveyor 408 and the lower transport conveyor 410 without interfering with loading and unloading of items 120 from the cross-belt conveyor 408. The robotic arms 416 can perform numerous tasks. For instance, the robotic arms 416 can be used to pick items 120 from or place items 120 on the rack conveyors 124 (or even onto the cross-belt conveyor 408). As can be seen in FIG. 5, the robotic arm 416 can service multiple levels 122 of the rack conveyors 124 without the need for vertically moving the vertical transport 104, which in turn can speed up the order fulfillment process. To further speed the loading process, the robotic arm 416 can load items 120 into the totes 118 at the same time the cross-belt conveyor 408 is loading items 120. The robotic arms 416 can also be used to handle servicing issues, like removing jammed items 120. In addition, the robotic arms 416 can be used to restock items 120 on the rack conveyors 124 by unloading items 120 from the vertical transport 104. Along with replenishing items 120, the robotic arms 416 as well as the vertical transport 104 can be used to rearrange items 120 onto other racks 102 and/or conveyors 124.

In the illustrated embodiment, the robotic arm 416 includes a rail engagement portion 502 where the robotic arm 416 engages the guide rail 414. Only a single guide rail 414 is shown in the drawings, but it should appreciated that more than one guide rail 414 can be used. For example, two (or more) guide rail 414 systems can be used in which robotic arms 416 are mounted on their own specified guide rail 414. This configuration allows the robotic arms 416 to service the full length of the racks 102 without significantly interfering with one another. When two robotic arms 416 are used, the robotic arms 416 can be primarily dedicated to service the racks 102 on a given side. In another variation, the robotic arms 416 can service both of the racks 102 at the same time. The engagement portion 502 includes a power supply, motor, sensors, controllers, and the like that allow the robotic arm 416 to move along the guide rail 414. As should be appreciated, the guide rail 414 can include contact wires that supply power to the robotic arm 416 as well as transmit signals for controlling the robotic arm 416. It should be recognized that the robotic arm 416 can send and receive signals in a number of manners, such as via a wireless and/or wired connection. The robotic arm 416 further has a rotation portion 504 that allows the robotic arm 416 to rotate in order to service both racks 102 and an arm portion 506 that has one or more moveable joints that position an end effector 508. The end effector 508 of the robotic arm 416 can grip and hold the items 120, such as via mechanical gripping and/or vacuum technologies, to name a few. In one embodiment, the end effector 508 includes mechanical grips with vacuum finger suction cups. As shown, the robotic arm 416 has a vision system 510 with one or more cameras 512 that are used to locate items 120, totes 118, structures, other robotic arms 416, and the like. As an example, the vision system 510 allows the robotic arm 416 to automatically locate and deposit items 120 into the totes 118. The robotic arm 416 can also be manually or semi-automatically controlled. For instance, an operator can remotely control the movement of the robotic arm 416 by viewing the robotic arm's 416 position through the cameras 512. The vision system 510 can also be used for collision avoidance for the robotic arms 416.

Figure 6:
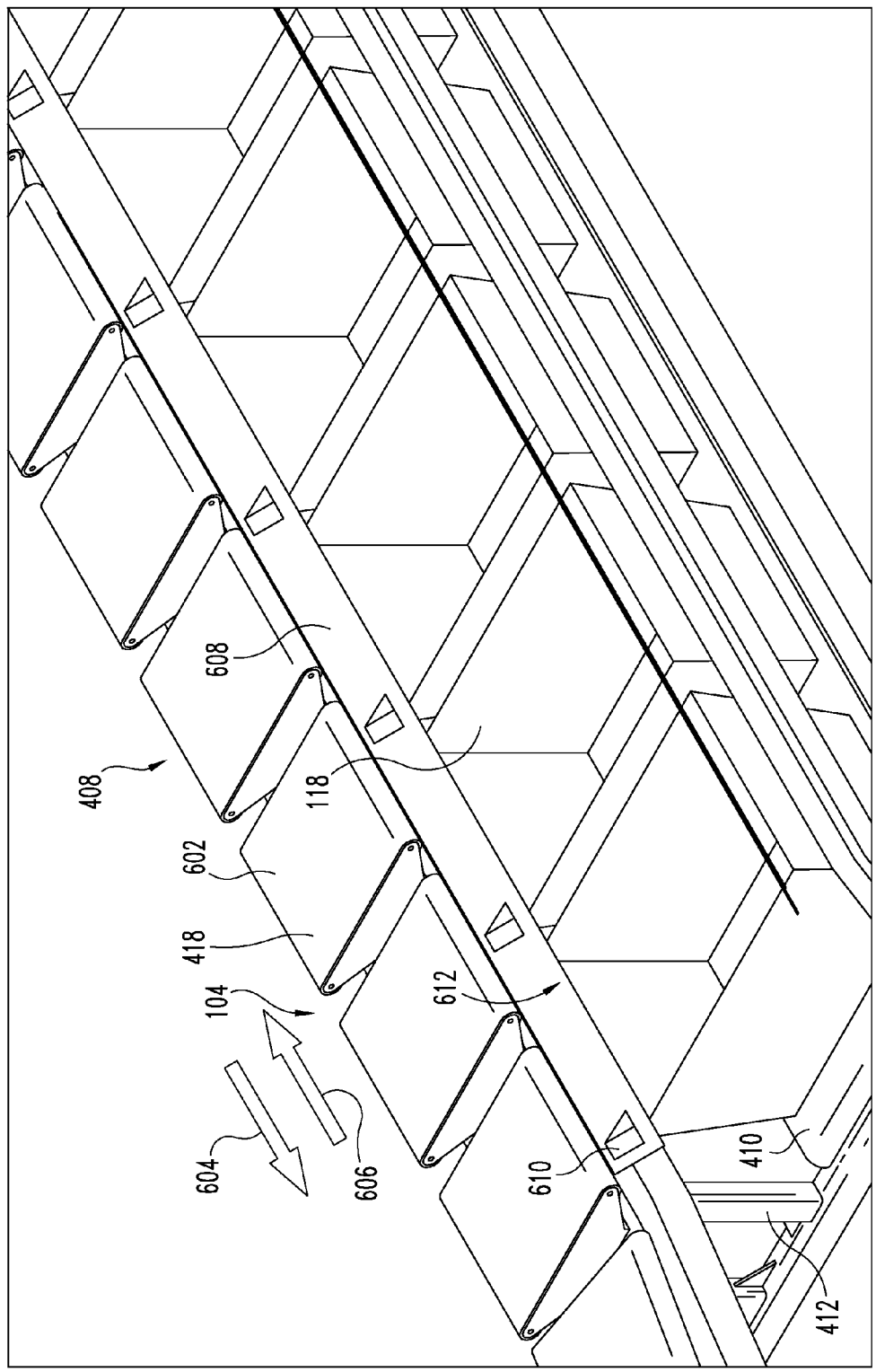
FIG. 6 is an enlarged perspective view of a vertical transport used in the FIG. 1 system.

FIG. 6 illustrates an enlarged, perspective view of the vertical transport 104. As can be seen, each carriage 418 of the cross-belt conveyor 408 is equipped with a small, individually powered belt carriage conveyor 602 that is mounted generally perpendicular to the direction of travel for the loop of carriages 418. Arrows 604 and 606 in FIG. 6 generally show these directions that the carriages 418 travel along the track 420 of the cross-belt conveyor 408. Each carriage conveyor 602 is able to operate independently of one another. As an example, one carriage 418 can be loaded while another carriage 418 can be unloaded or remain idle.

Between the cross-belt conveyor 408 and the totes 118 (on both sides), the vertical transport 104 has a guide or slide ramp 608 on which items 120 from the carriages 418 slide into the totes 118. In the illustrated embodiment, the ramp 608 includes a series of standoffs 610 that define chutes in which items 120 slide into their respective totes 118. The standoffs 610 in the depicted embodiment are triangular (arrow) shaped so as to enhance guidance of items 120, but it is contemplated that the standoffs 610 can be shaped differently in other embodiments. The totes 118 on the transport conveyor 410 are generally aligned at individual chutes 612 and/or designated loading areas. To ensure that the totes 118 are properly positioned at the correct location, if needed, the vertical transport 104 can include various sensors, stops, barcode readers, etc. For items 120 that do not require a tote 118, such as heavy or large items 120, sections of the transport conveyor 410 can be empty (i.e., without a tote 118) such that the items 120 can be directly loaded onto the transport conveyor 410 via the robotic arm 416. In view of this, it should be appreciated that the totes, pallets, containers, and other support structures 118 can be optional in other embodiments. As an example, if only full cases of items 120 are being picked, then a tote or carton 118 would not be required, and the full case could be put directly onto the transport conveyor 410 or onto a pallet. In another example, when full cases are being picked, the robotic arm 416 could build full pallets on the transport conveyor 410 (e.g., mixed pallet loads for the beverage industry). The transport conveyor 410 in the embodiment shown is a belt conveyor, but again, it should be recognized that other types of conveyors can be used, such as the types mentioned before. The transport conveyor 410 in FIG. 6 is secured to the frame 412 so that the elevator 110 is able to lift the totes 118 on the transport conveyor 410. As will be described in selected embodiments below, the transport conveyor 410 can remain on the floor 116 when the vertical transport 104 is raised. In this example, the frame 412 of the vertical transport 104 has rails that hold the totes 118 when lifted. In still yet another variation, the vertical transport 104 is eliminated such that the totes 118 are directly loaded onto the frame 412 of the vertical transport 104.

Figure 7:
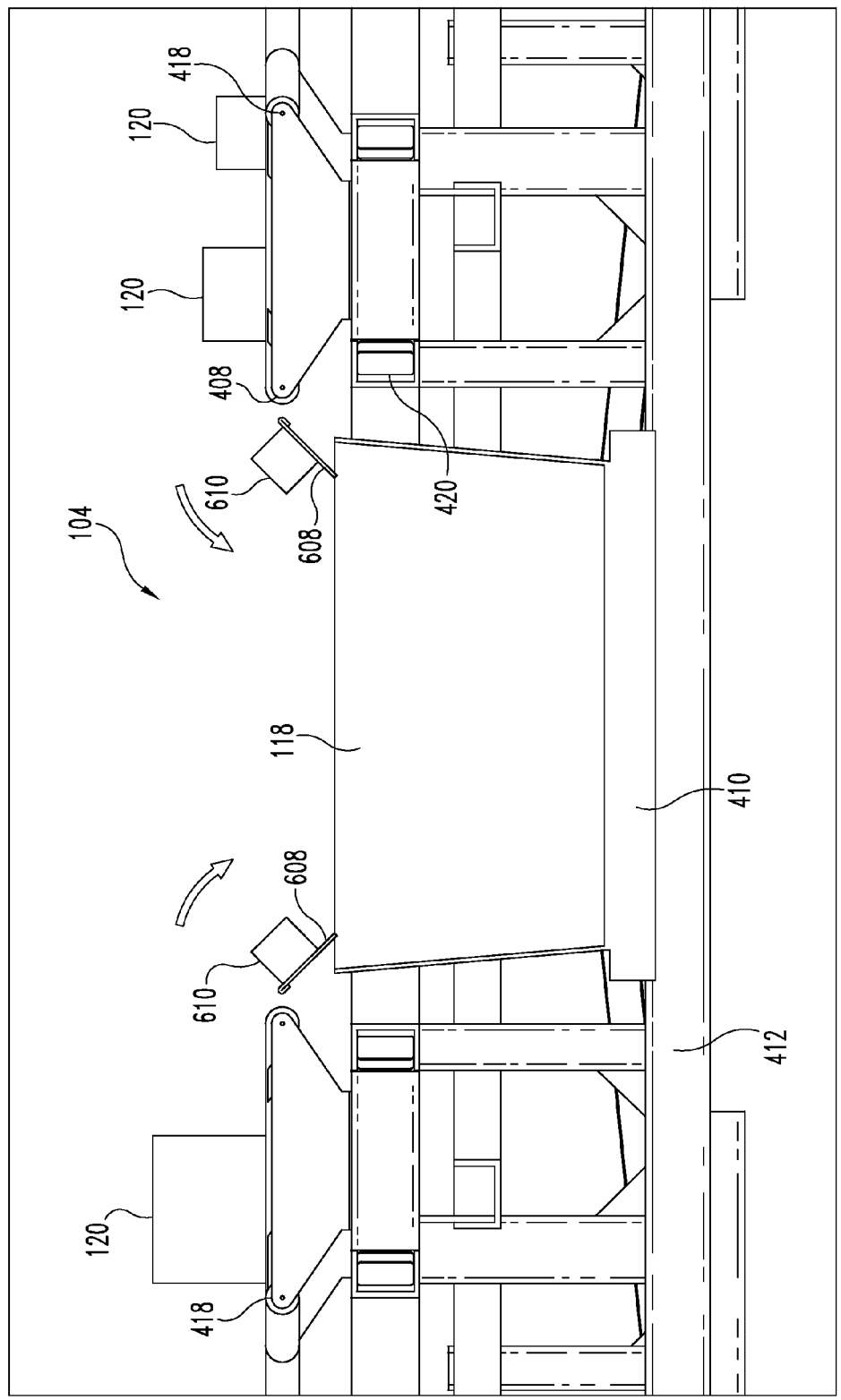
FIG. 7 is a cross-sectional view of the FIG. 6 vertical transport.

FIG. 7 shows an enlarged, partial cross-sectional view of the vertical transport 104 while items 120 are loaded into a tote 118. With the cross-belt conveyor 408 located on more than one side of the tote 118, which in the illustrated example is opposite sides of the tote 118, items 120 from the opposing racks 102 can be loaded simultaneously or near simultaneously. Once the item 120 is unloaded from the carriage 418, the next carriage 418 can be moved into place to unload the next item 120 into the tote 118 by the cross-belt conveyor rotating in direction 604 or 606 (FIG. 6). As should be appreciated, this allows the totes 118 to be rapidly filled with the items from a given level 122, which allows orders to be fulfilled in a rapid manner. As noted before, in the past, the vertical movement tended to slow down order fulfillment, but having the ability to simultaneously load items from the opposing vertical conveyor stacks at the same time alleviates this issue so as to make vertical storage systems commercially practical.

Figure 8:
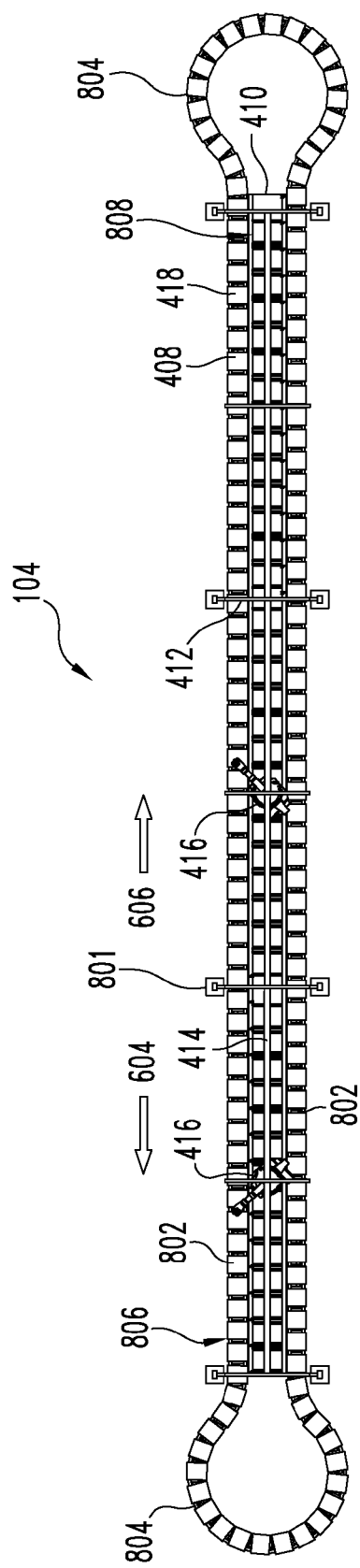
FIG. 8 is a top, plan view of the FIG. 6 vertical transport.
Figure 9:
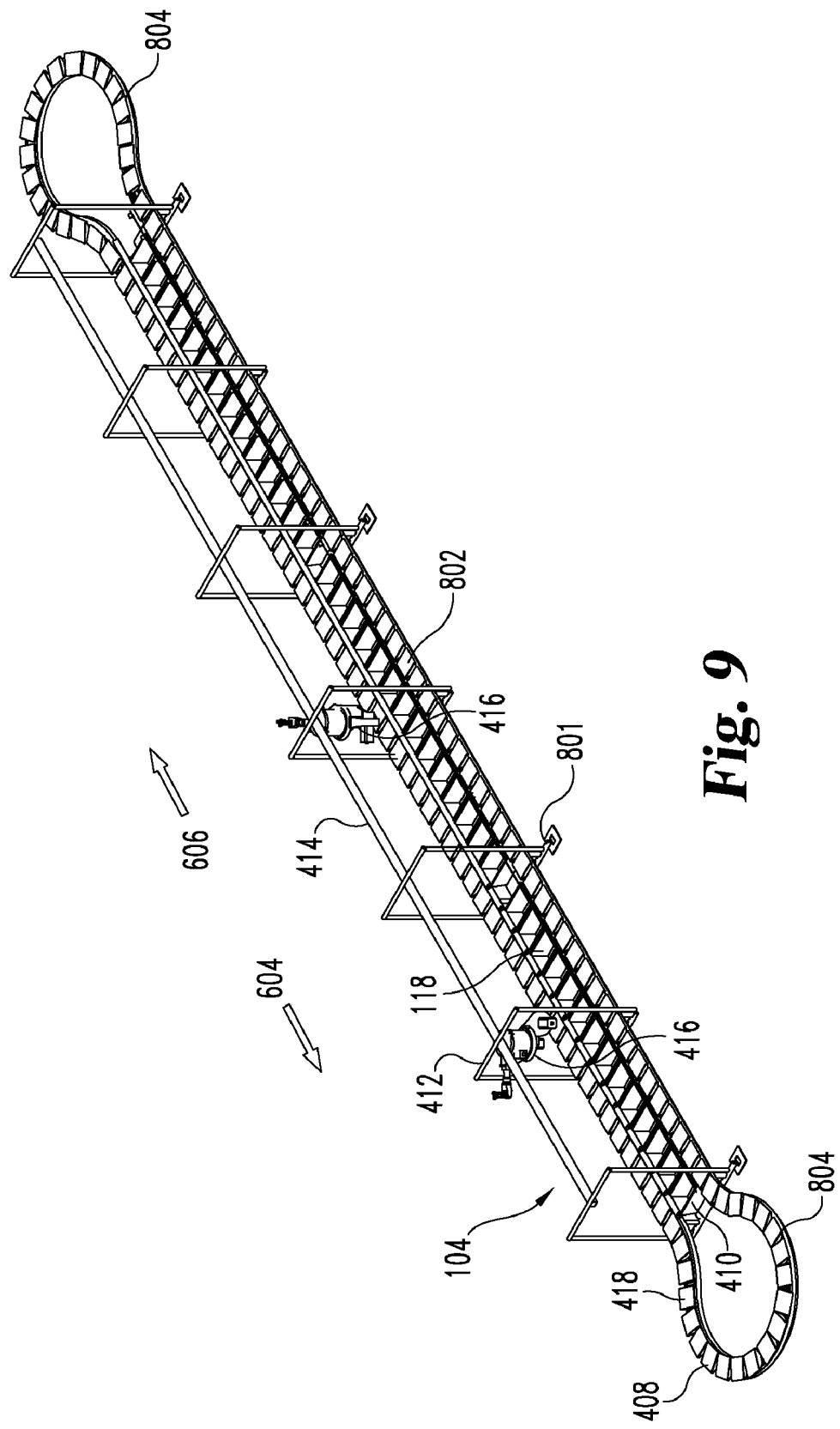
FIG. 9 is a perspective view of the FIG. 6 vertical transport.

This ability to rapidly load the totes 118 might be better appreciated from FIGS. 8 and 9, which respectively show a top plan view and a perspective view of the vertical transport 104. As can be seen, the support frame 412 of the vertical transport 104 has one or more elevator guides 801 that are slidably received around the elevator support structure 406 in order to stabilize the vertical transport 104 during operation. The cross-belt conveyor 408 has two transfer sections 802 located on opposite sides of the transport conveyor 410 that are joined together by two looped end sections 804 so as to form a continuous loop. In the illustrated embodiment, the transfer sections 802 are generally straight as well as oriented in a parallel manner, and the looped end sections 804 are generally circular-shaped. However, it should be recognized that the cross-belt conveyor 408 can be shaped differently in other embodiments.

With the ability of the cross-belt conveyor 408 to move in a counterclockwise 604 or clockwise direction 606, the destination tote 118 does not need be aligned with or even located near the rack conveyor 124 supplying the required items 120. For example, looking at FIGS. 2 and 8, an item 120 from the far upper leftmost rack conveyor 124, as is viewed in FIG. 2 and as identified by location arrow 806 in FIG. 8, can be delivered to the far rightmost tote 118 on the vertical transport 104, as identified by location arrow 808 in FIG. 8, by simply rotating the cross-belt conveyor 408 in the clockwise direction 606 (FIG. 8). In particular, the item 120 from the left most rack conveyor 124 is loaded onto the carriage 418 that is positioned at location 806. From position 806, the cross-belt conveyor 408 in this example is rotated in a clockwise direction 606 until the carriage 418 with the item 120 is positioned at location 808, and once at location 808, the item 120 is unloaded into the tote 118 from the carriage 418. It should be recognized that the movement of the cross-belt conveyor 408 need not stop during loading and unloading of items, such that the process is nearly continuous. Moreover, multiple items 120 from the same rack conveyor 124 can be loaded onto successive carriages 418 so as to form a virtual stream of items 120 on the cross-belt conveyor 408. It should be recognized that items 120 can be loaded in other manners, such as in an alternating pattern. During routine operation, multiple rack conveyors 124 are unloaded and multiple totes 118 are loaded simultaneously or near simultaneously, thereby significantly speeding the loading/unloading process. In addition, items 120 can be loaded from opposite sides of a tote 118 at the same time, thereby further increasing loading efficiency. Multiple items 120 can be queued onto a single carriage 418 such that the same carriage 418 can service multiple totes 118 as the carriage 418 travels without the need for reloading of the carriage 418. During the loading of the totes 118, the cross-belt conveyor 408 can change its direction multiple times so as to load the totes 118 in an efficient manner.

In one embodiment, each rack conveyor 124 has a conveyor motor such that each rack conveyor 124 is self-powered. However, as discussed before, having each rack conveyor 124 self-powered via separate motors has several drawbacks, including high construction and maintenance costs. To address these concerns, the system 100 in other embodiments has rack conveyors 124 without dedicated conveyor motors, and instead, the system 100 only powers the rack conveyors 124 on a temporary or as-needed basis.

Figure 10:
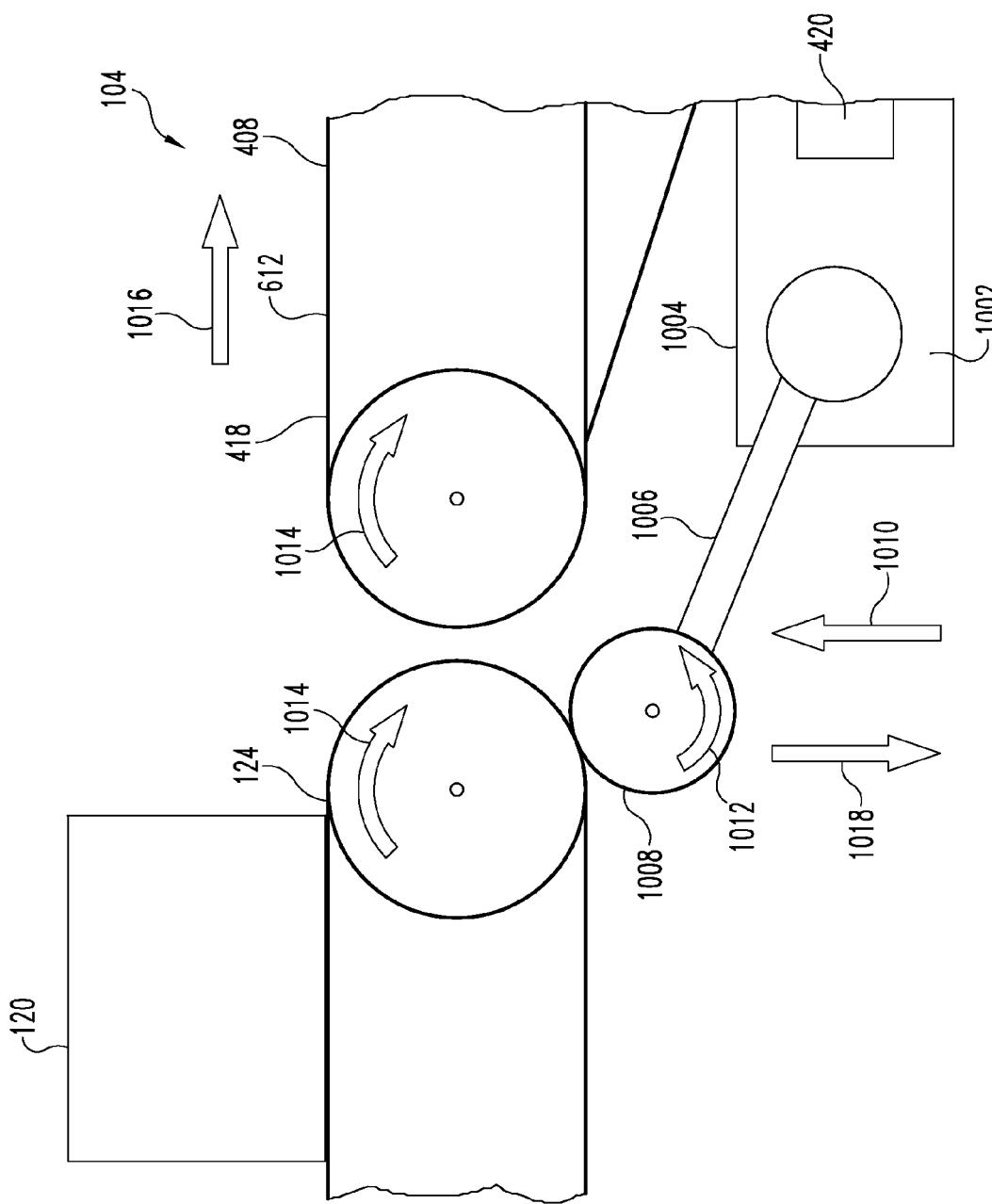
FIG. 10 is an enlarged side view of a first example of how rack conveyors can be powered by a conveyor driver in the FIG. 1 system.

FIG. 10 illustrates an enlarged side view of one example where the rack conveyor is powered on an as-needed basis. As shown, the vertical transport 104 has one or more conveyor drivers 1002 mounted to the carriage track 420 of the cross-belt conveyor 408. As can be seen, the conveyor driver 1002 includes a main body 1004 where the conveyor driver 1002 is either fixed to or able to slide horizontally along the carriage track 420. In the illustrated embodiment, the conveyor driver 1002 is configured to horizontally move along the carriage track 420. The conveyor driver 1002 can move horizontally via chain drives, belt drives, magnetic drives, etc., and/or the conveyor driver 1002 can incorporate an internal drive to move it horizontally. A pivot arm 1006 is pivotally mounted to the main body 1004, and at its end, the pivot arm 1006 has a drive roller or wheel 1008 that is used to power the rack conveyor 124. The main body 1004 includes a motor, piston, or some other type of actuator, such as a pneumatic, hydraulic, and/or electrically powered one, that rotates the pivot arm 1006, as is indicated by arrow 1010 so that the drive wheel 1008 is able to engage and disengage from the rack conveyor 124. In FIG. 10, the drive wheel 1008 engages the underside of the rack conveyor 124 so as to not interfere with the items 120 on the rack conveyor 124, but the conveyor driver 1002 can engage the rack conveyor 124 at other locations and/or in different manners. For example, the conveyor driver 1002 in other embodiments includes a male connection that engages a female connection next to the rack conveyor 124, and a bevel gear rotates the conveyor drive roller in either direction. The drive wheel 1008 of the conveyor driver 1002 in one embodiment is self-powered via a motor or the like, and in another embodiment, the drive wheel 1008 is remotely powered by a motor or the like in the main body 1004, such as via a drive belt or drive shaft. It should be recognized that the drive wheel 1008 can be powered in other manners. For example, as will be explained below with reference to FIG. 11, the drive wheel 1008 can be unpowered, but the drive wheel 1008 can be used to transmit power from the cross-belt conveyor 408 to the rack conveyor 124.

Returning to the FIG. 10 embodiment, the drive wheel 1008 rotates before, during, or after the drive wheel 1008 contacts the rack conveyor 124. Engagement between the drive wheel 1008 and the rack conveyor 124 can be enhanced via surface roughening, gear-like structures, treads, and the like. In the illustrated example, the drive wheel 1008 rotates in a counterclockwise direction, as indicated by arrow 1012, to advance the item 120 on the rack conveyor 124, but it should be recognized that the drive wheel 1008 can rotate in a different direction in other embodiments. Moreover, the drive wheel 1008 can also alternate directions depending on whether the rack conveyor 124 is being loaded or unloaded. When the drive wheel 1008 rotates in the counterclockwise direction 1012, the rollers of the rack conveyor 124 rotate in a clockwise direction 1014, thereby moving the item 120 in direction 1016 onto the carriage 418 of the cross-belt conveyor 408. Once the item 120 is loaded onto the carriage 418, the drive wheel 1008 can continue to rotate to load subsequent items onto the same carriage 418 or other carriages 418 positioned next to the rack conveyor 124. Once the desired items 120 are unloaded from the rack conveyor 124, the conveyor driver 1002 disengages the drive wheel 1008 from the rack conveyor 124 by rotating the pivot arm 1006 in a downward direction 1018. When the vertical transport 104 is vertically moved, the conveyor driver 1002 rotates the pivot arm 1006 in the downward direction 1018 to a position where the drive wheel 1008 does not interfere with lowering or raising of the vertical transport 104. It should be appreciated that interference between the conveyor driver 1002 and the rack conveyor 124 can be avoided in other manners. For example, the conveyor driver 1002 can be moved to one of the ends of the vertical transport 104, near one of the two looped end sections 804 of the cross-belt conveyor 408 or to an empty area between the rack conveyors 124 (or between the racks 102). When a different type of conveyor driver 1002 is used, collision avoidance between the rack conveyors 124 and the conveyor drivers 1002 during movement of the vertical transport 104 can occur in other manners.

Turning to FIG. 11, the drive wheel 1008 in this embodiment is unpowered. As can be seen, the drive wheel 1008 of the conveyor driver 1002 contacts both the conveyor belts of the carriage 418 and the storage conveyor 124. The conveyor belt 602 of the carriage 418 in the illustrated example is powered, and the drive wheel 1008 of the conveyor driver 1002 transmits this power from the carriage 418 to the rack conveyor 124 so that items 120 can be unloaded from (or loaded onto) the rack conveyor 124. In still yet another embodiment, both the carriage 418 of the cross-belt conveyor 408 and the rack conveyor 124 are unpowered, but the drive wheel 1008 of the conveyor driver 1002 is powered. The carriage 418 and the rack conveyor 124 can be powered simultaneously when the drive wheel 1008 of the conveyor driver 1002 is positioned in the manner illustrated in FIG. 11. It should be recognized that the drive wheel 1008 can be repositioned to contact only one of the conveyors so that the rack conveyor 124 and the carriage 418 can operate independently. With this embodiment, it should be appreciated that the number of drive components, like conveyor motors for the cross-belt conveyors 408, is further reduced.

In the FIGS. 10 and 11 embodiments, the conveyor driver 1002 is configured to slide or move along the carriage track 420 (or other support structure) so that the conveyor driver 1002 is able to power multiple rack conveyors 124. In one particular variation, the vertical transport 104 has pairs of conveyor drivers 1002 positioned on opposites sides of the vertical transport 104 so that each conveyor driver 1002 is dedicated to power the rack conveyors 124 for one of the racks 102. For this variation, the vertical transport 104 in one form has a single conveyor driver 1002 on opposite sides facing each rack 102, and the vertical transport 104 in another form has two or more conveyor drivers 1002 dedicated to power each rack 102. In still yet another variation, the conveyor drivers 1002 are able to loop around the vertical transport 104 in a fashion similar to the carriages 418 of the cross-belt conveyor 408 so that the conveyor drivers 1002 can be better utilized for powering the racks 102. With this configuration, it is conceivable that a single conveyor driver 1002 could power the rack conveyors 124 for the entire system 100, but typically, more than one conveyor driver 1002 is used to speed up the process as well as to act as a back-up in case one of the conveyor drivers 1002 fails. With the conveyor drivers 1002 associated with the vertical transport 104, maintenance can be simplified because all of the higher maintenance items that tend to wear more or have higher failure rates are located on one piece of equipment, the vertical transport 104, which can be easily lowered for service. For example, when one breaks, the conveyor driver 1002 can be easily removed and replaced with a new one with minimal downtime.

By having the ability to move vertically with the vertical transport 104 and/or horizontally along the vertical transport 104, the number of conveyor drivers 1002 needed to power the system 100 is significantly reduced. Nevertheless, moving the conveyor drivers 1002 horizontally along the vertical transport 104 can slow down loading of the cross-belt conveyor 408, so in another embodiment, multiple conveyor drivers 1002 are fixed along the length of each side of the vertical transport 104. The number of conveyor drivers 1002 in this embodiment corresponds to the number of columns of rack conveyors 124 in the rack 102. In other words, a conveyor driver 1002 is positioned and associated with each rack conveyor 124 for a given level 122 of the rack 102. With this configuration, the vertical transport 104 is able to simultaneously drive all of the rack conveyors 124 for an individual level 122 of the rack 102. As should be appreciated, even with this configuration, the number of drive motors required is still significantly reduced.

Figure 12:
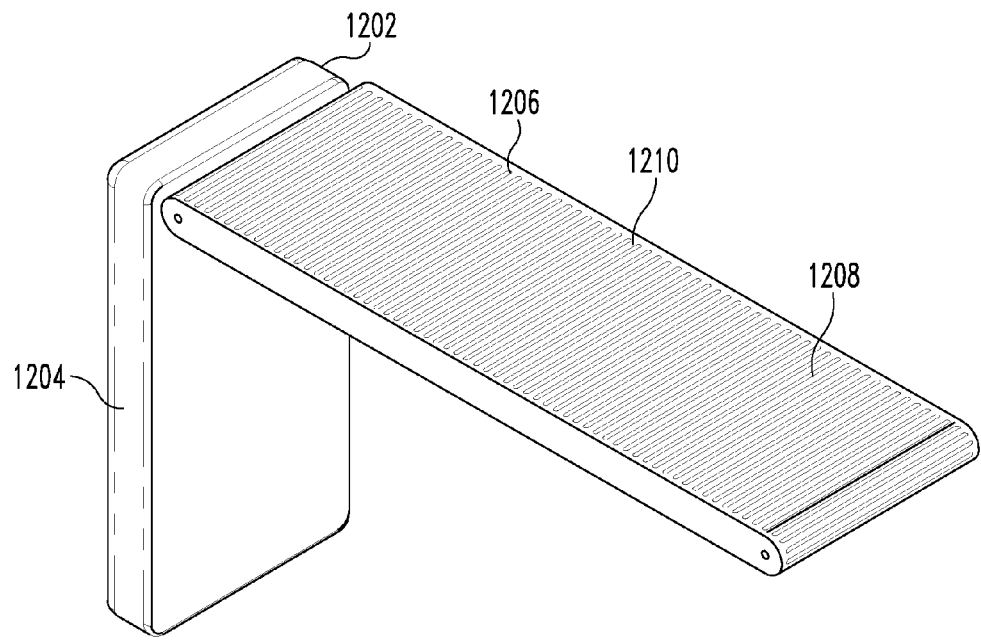
FIG. 12 is a perspective view of a conveyor driver according to another embodiment.
Figure 13:
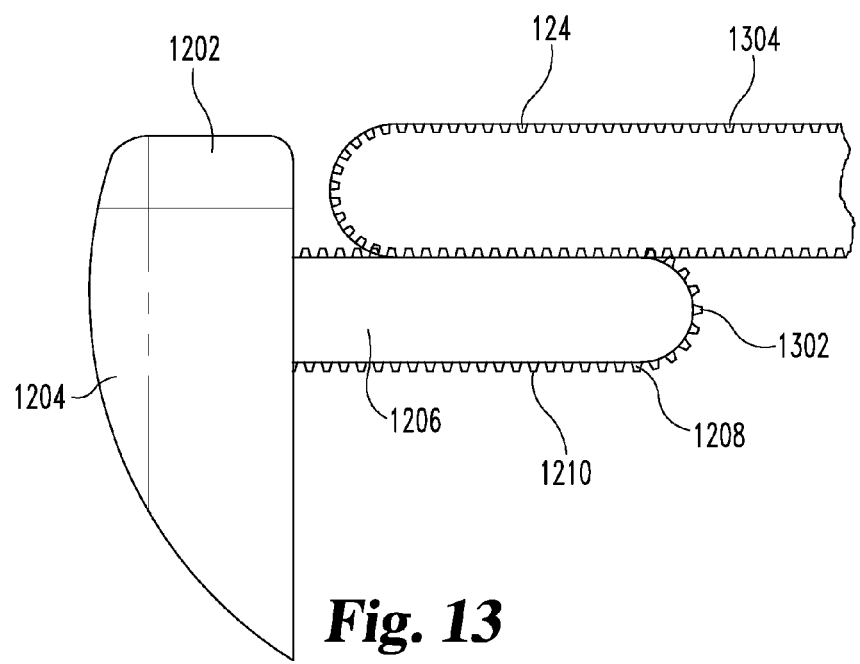
FIG. 13 is an enlarged side view that shows the engagement between the FIG. 12 conveyor driver and a rack conveyor.

FIG. 12 illustrates still yet another variation of the conveyor driver 1002 illustrated in FIG. 11. Like the previous embodiments, a conveyor driver 1202 in FIG. 12 includes a main body 1204 and a pivot or engagement arm 1206. A drive belt 1208 for powering the rack conveyors 124 travels around the engagement arm 1206. As can be seen, the drive belt 1208 has texturing 1210 that enhances the engagement between the drive belt 1208 and the rack conveyor 124. Looking at FIG. 13, the drive belt 1208 has a series of ribs 1302 that engage corresponding notches 1304 in the rack conveyor 124 (or vice-versa). Similar to the previous embodiments, the engagement arm 1206 is configured to pivot or retract out of the way when moved so as to avoid collisions with the racks 102. It is contemplated that other types of mechanisms can be used to drive the rack conveyors 124. For example, the conveyor drivers 1202 can incorporate separate gears that mesh together to create a male-female connection. It should be recognized that the conveyor driver 1202 in FIG. 12 can be powered (or unpowered) in the manner as described above with the previous embodiments.

In the above examples, the conveyor drivers 1002, 1202 move vertically in unison with the vertical transport 104. There are times, however, when loading speeds can be hampered with such an arrangement. Several embodiments, some of which are described below, address this issue by allowing the rack conveyors 124 to be indexed even when the vertical transport 104 is not positioned at the same level 122 on the rack 102. These arrangements allow for more efficient indexing of the rack conveyors 124. For example, when the robotic arm 416 removes an item 120 from a rack conveyor 124 and no more items 120 are needed from the same rack conveyor 124, the conveyor driver 1002, 1202 can delay indexing the rack conveyor 124 until the vertical transport 104 is at a different level 122 and/or until the vertical transport 104 is lowered for unloading the totes 118 onto the outgoing conveyor 108 (FIG. 2). As another example, the robotic arm 416 is able to place or retrieve items 120 from different levels 122 because the conveyor drivers 1002, 1202 are able to index the rack conveyors 124 at different levels, regardless of where the vertical transport 104 is located. As mentioned before, this allows the robotic arm 416 to unload (or load) items 120 from a rack conveyor 124 at one level 122 while the cross-belt conveyor 408 unloads (or loads) from rack conveyors 124 at a different level 122.

Figure 14:
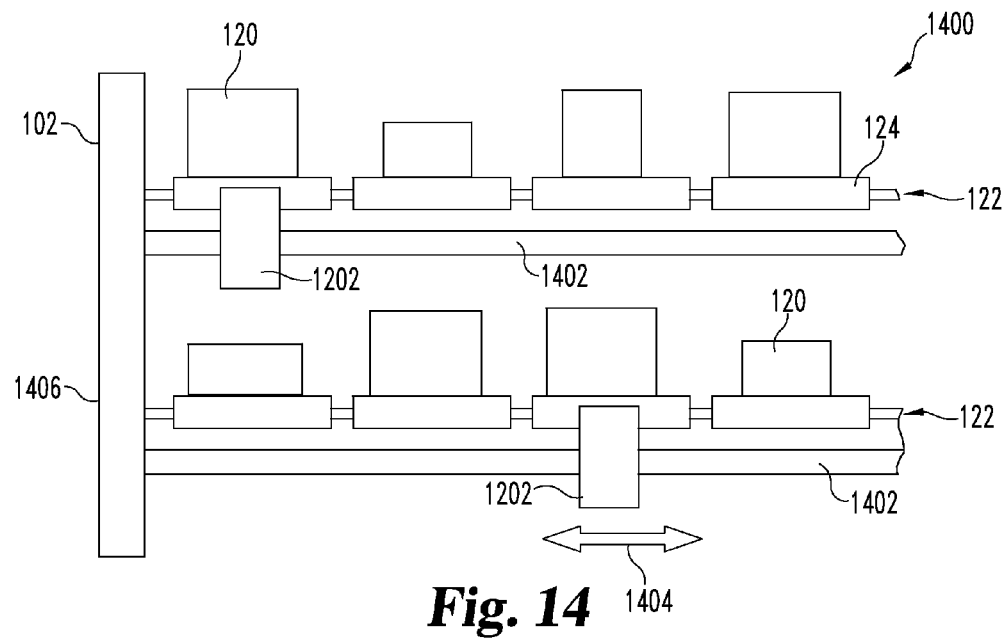
FIG. 14 is an enlarged view of a conveyor drive system according to a further embodiment.

FIG. 14 illustrates an enlarged view of a conveyor drive system 1400 according to one embodiment. As can be seen, the conveyor drivers 1202 in the system 1400 are associated with each level 122 in the rack 102 such that the conveyor drivers 1202 are unable to move vertically. In the illustrated embodiment, each level 122 of the rack 102 has a single conveyor driver 1202, but each level 122 can have more than one conveyor driver 1202, if so needed. The conveyor drivers 1202 are able to move horizontally, as is indicated by double arrow 1404, along a guide rail 1402 that is secured to one or more risers 1406 of the rack 102. The conveyor drivers 1202 can be moved horizontally via chain drives, belt drives, magnetic drives, etc., and/or the conveyor drivers 1202 can incorporate internal drives to move them horizontally. It should be appreciated that the conveyor drivers 1202 can move in other manners. In other embodiments, external structures (other than the rack 102) can be used to secure the guide rails 1402 in a vertically secure manner. By having one or more conveyor drivers 1202 dedicated to each level 122, rack conveyors 124 on different levels 122 can be indexed simultaneously or in a near simultaneous manner. Even with this semi-dedicated arrangement, the number of required conveyor drivers 1202 is still significantly reduced because the conveyor drivers 1202 can service more than one rack conveyor 124 by moving in the horizontal direction 1404. In one form, the conveyor drivers 1202 can be positioned along the sides of the racks 102 that face the vertical transport 104, and in another form, the conveyor drivers 1202 can be positioned on the outer ends of the racks 102 that face away from the vertical transport 104 so as to avoid interfering with the vertical transport 104.

In other embodiments, which will be described below, the conveyor drivers 1002, 1202 operate independently of the vertical transport 104. That is, the conveyor drivers 1002, 1202 are able to move in a vertical direction, independently of the vertical transport 104. This allows the conveyor drivers 1002, 1202 to index the conveyors 124 before, during, or after the vertical transport 104 is positioned at a specific level 122.

Figure 15:
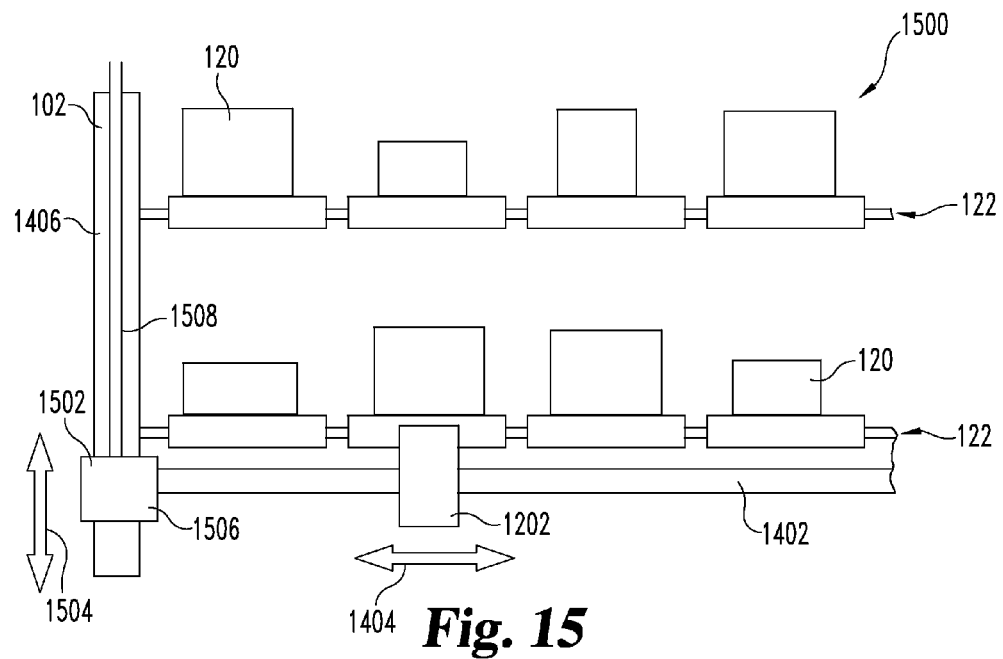
FIG. 15 is an enlarged view of a conveyor drive system according to a still yet another embodiment.

FIG. 15 illustrates an enlarged view of a conveyor drive system 1500 according to another embodiment. In the conveyor drive system 1500 of FIG. 15, the conveyor drivers 1202, via a lift device or drive elevator 1502, are able to move in a horizontal direction 1404 as well as in a vertical direction 1504. The conveyor driver 1202 is mounted onto the guide rail 1402 in such a manner that the conveyor driver 1202 is able to horizontally move or slide along the guide rail 1402 in the same fashion as was described above with reference to FIG. 14. In the illustrated embodiment, the guide rail 1402 has a single conveyor driver 1202, but the guide rail 1402 can have more than one conveyor driver 1202 in other embodiments. As can be seen, the guide rail 1402 in FIG. 15 is secured to a support or guide 1506 of the drive elevator 1502, which guides the guide rail 1402 along with the conveyor driver 1202 in the vertical direction 1504. The one or more guides 1506 slide along one or more risers 1406 of the rack 102. Alternatively or additionally, the guides 1506 can move along other external structures, besides the risers 1406 of the rack 102. In the depicted embodiment, the drive elevator 1502 is a traction-type elevator that includes one or more pulleys, counterweights, and motors mounted to the guide 1506. One or more cables 1508 on the pulleys are attached to the guides 1506, and the motors along with the counterweights move the guide rail 1402 via the cables 1508. It should be recognized that other types of elevators can be used. For instance, the elevator 1502 in other embodiments can include hydraulic, electromagnetic, and/or climbing elevators, to name just a few examples. With the system 1500 in FIG. 15, the conveyor driver 1202 can service the rack conveyors 124 on any level 122, independent of the vertical transport 104. In the illustrated example, the guide rail 1402 is a discrete, straight segment, but in other variations, the guide rail 1402 can be shaped differently. For instance, the guide rail 1402 can be looped in a fashion similar to the cross-belt conveyor 408, and this looped guide rail 1402 is sized slightly larger than the vertical transport 104 so that the guide rail 1402 can move independently of the vertical transport 104 without interference.

As should be appreciated, the vertical transport 104 can be loaded in numerous and varying sequences. For example, with reference to FIG. 1, the vertical transport 104 can start loading at the bottom of the racks 102 and move upwards during loading (or unloading) of items 120 from the rack conveyors 124. With this example, items 120 can be loaded or unloaded in an almost immediate fashion. By loading in such a manner, the heavier items 120 are loaded into the bottoms of the totes 118, thereby reducing the chances that the lighter items 120 will be crushed. As another example, the vertical transport 104 can be initially raised to the top level 122 of the racks 102 or to the highest level 122 from which items 120 need to be unloaded. The vertical transport 104 then is lowered as items 120 are loaded from various levels 122. It should be recognized that loading items 120 in such a manner reduces energy consumption, because the conveyor elevator 110 does not need to raise the vertical transport 104 when loaded with items 120. To conserve energy as well as speed up the loading or unloading process, higher demand items 120 can be tactically located where they are readily accessible. For instance, high demand items 120 can be located at the lower levels 122 of the racks 102; while lower demand items 120 can be positioned at the higher levels 122. Moreover, higher demand items 120 can be concentrated on the rack conveyors 124 that are centrally located within a given level 122 so as to reduce the average travel distance between the higher demand items 120 and the totes 118 on the vertical transport 104. Alternatively or additionally, the higher demand items 120 can be dispersed on a single level 122 (or multiple levels 122) across multiple rack conveyors 124 at even or uneven intervals in order to minimize travel distances during loading of the totes 118.

Figure 16:
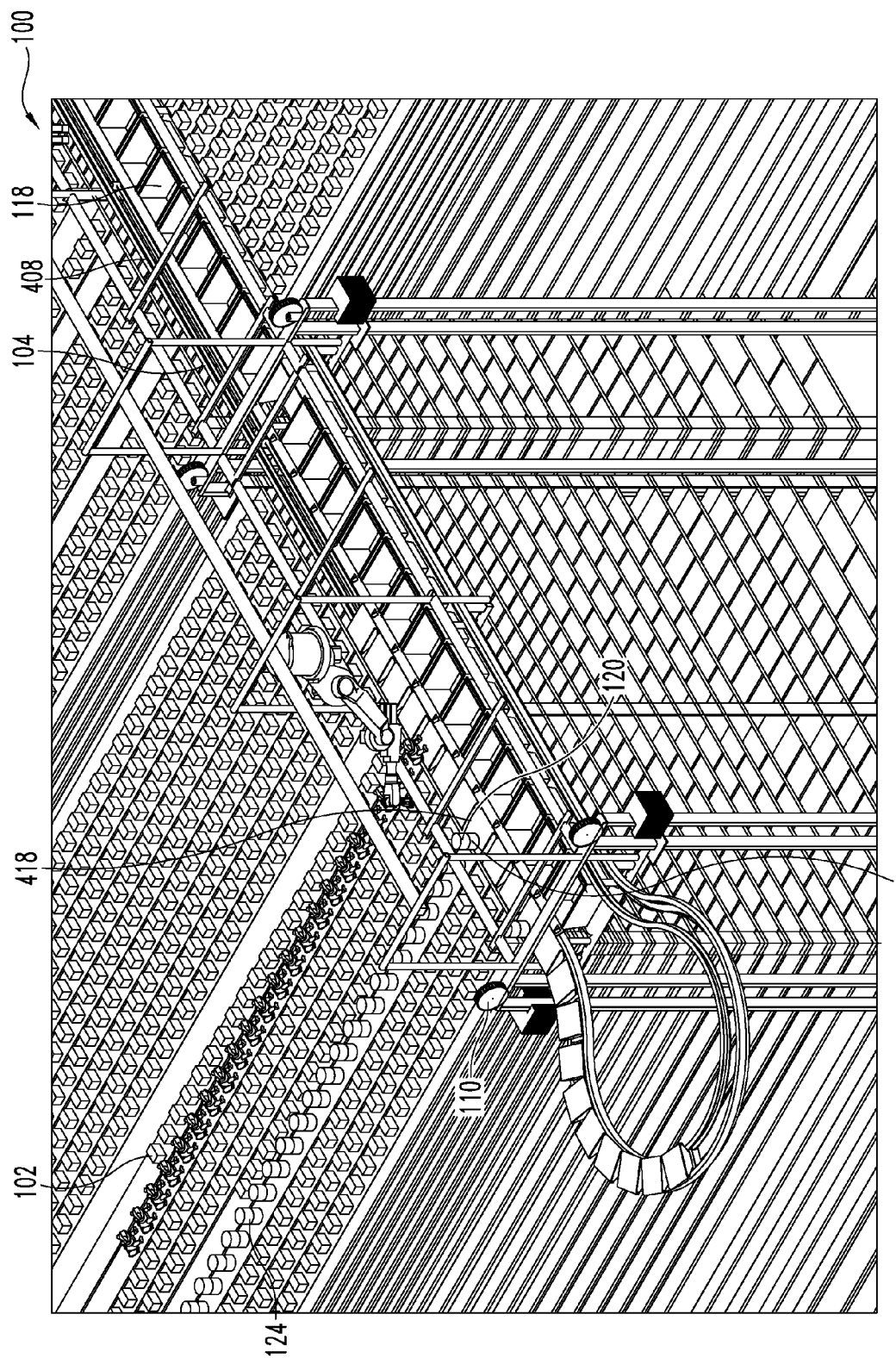
FIGS. 16 and 17 are partial, perspective views of the FIG. 1 system that illustrate various stages of a loading sequence.
Figure 17:
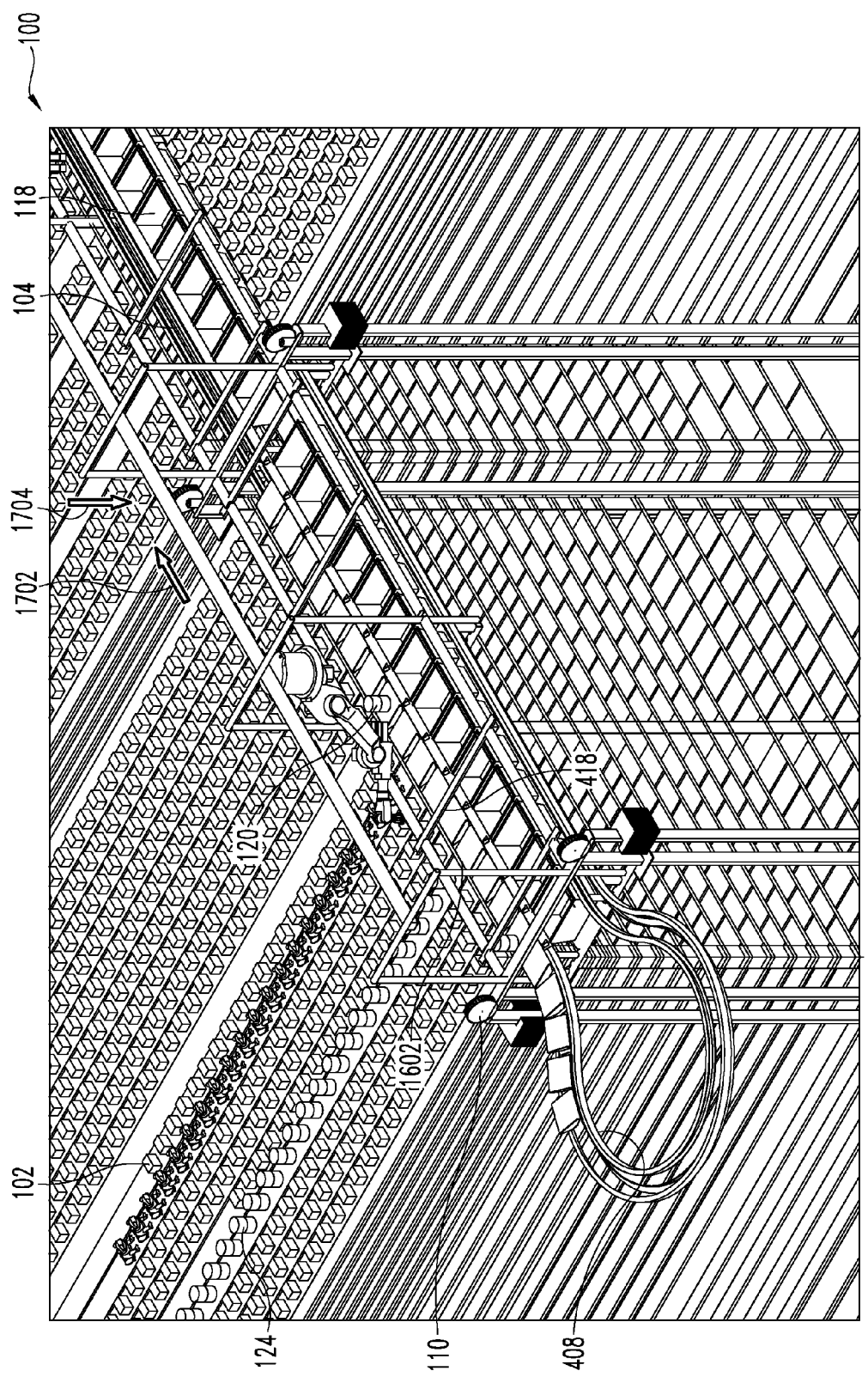

FIGS. 16 and 17 are partial, perspective views of the system 100 that illustrate one sequence of loading items 120. For easy viewing, a rack 102 along with a section of carriages 418 of the cross-belt conveyor 408 have been removed in FIGS. 16 and 17. Referring to FIG. 16, a conveyor driver 1202 runs the desired rack conveyor 124 so that an item 120 that needs to be loaded (as indicated by reference number 1602) is loaded onto a carriage 418 of the cross-belt conveyor 408. As can be seen in FIG. 17, the cross-belt conveyor 408 rotates in a clockwise direction 1702 (to the right in FIG. 17) as the vertical transport 104 moves in a downward direction 1704. Once the target tote 118 is reached, the carriage 418 is activated to unload the item 1602 into the proper tote 118. Other items 120 can be loaded in a similar fashion.

A three-dimensional storage system 1800 according to still yet another embodiment will be initially described with reference to FIGS. 18, 19, and 20, which respectively depict end, top, and cross-sectional views of the system 1800. As can be seen in the drawings, the system 1800 of FIG. 18 shares a majority of features in common with the system 100 previously described with reference to FIG. 1. For example, the system 1800 in FIGS. 18-20 includes the racks 102 with rack conveyors 124 on various levels 122, an incoming conveyor 106, an outgoing conveyor 108, an elevator 110, and one or more robotic arms 416. For the sake of brevity and clarity, these as well as other common features will not be again described in great detail below, but reference is made to the previous discussions.

Figure 18:
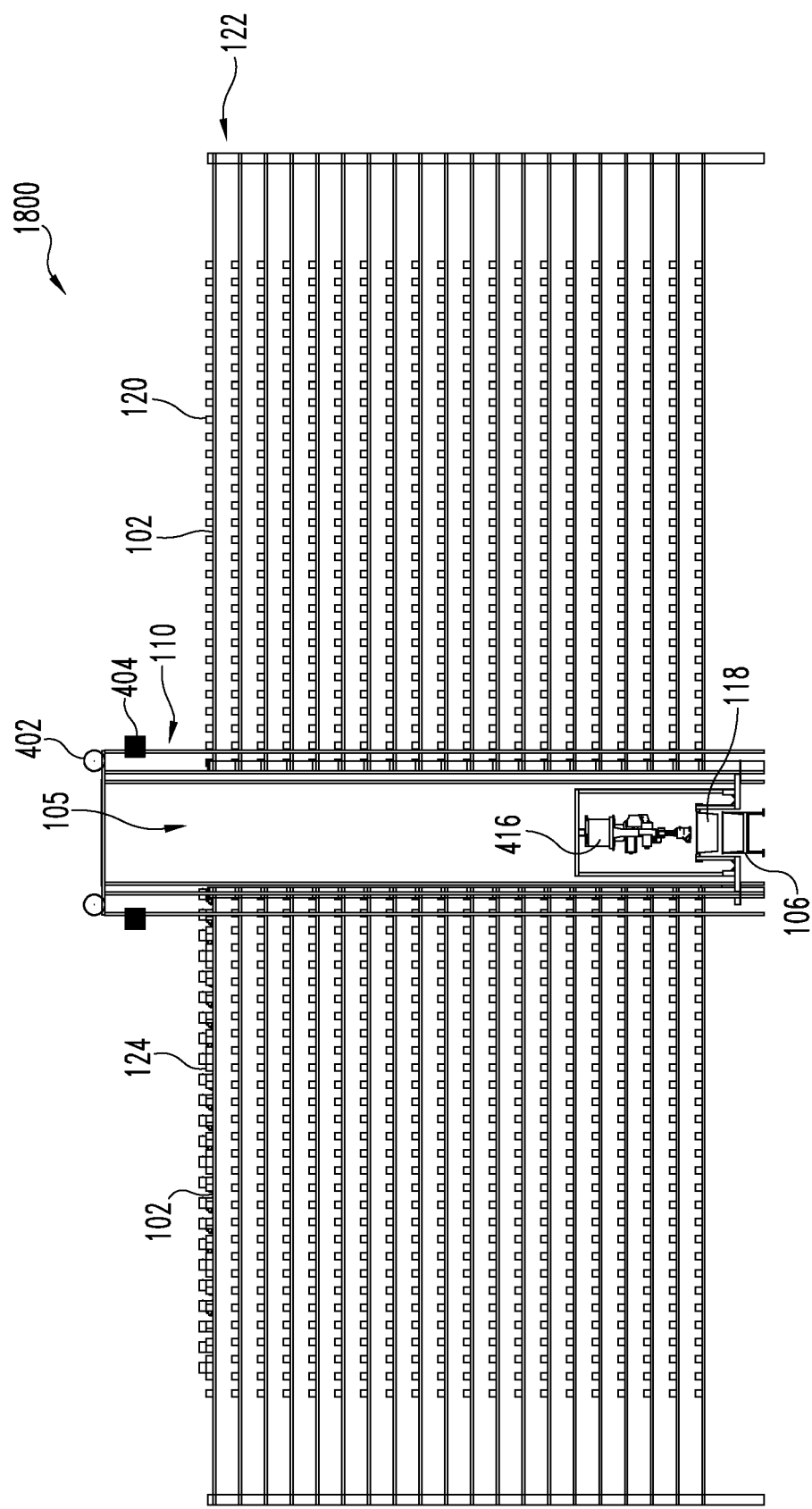
FIG. 18 is a front-end view of a three-dimensional storage system according to a further embodiment
Figure 19:
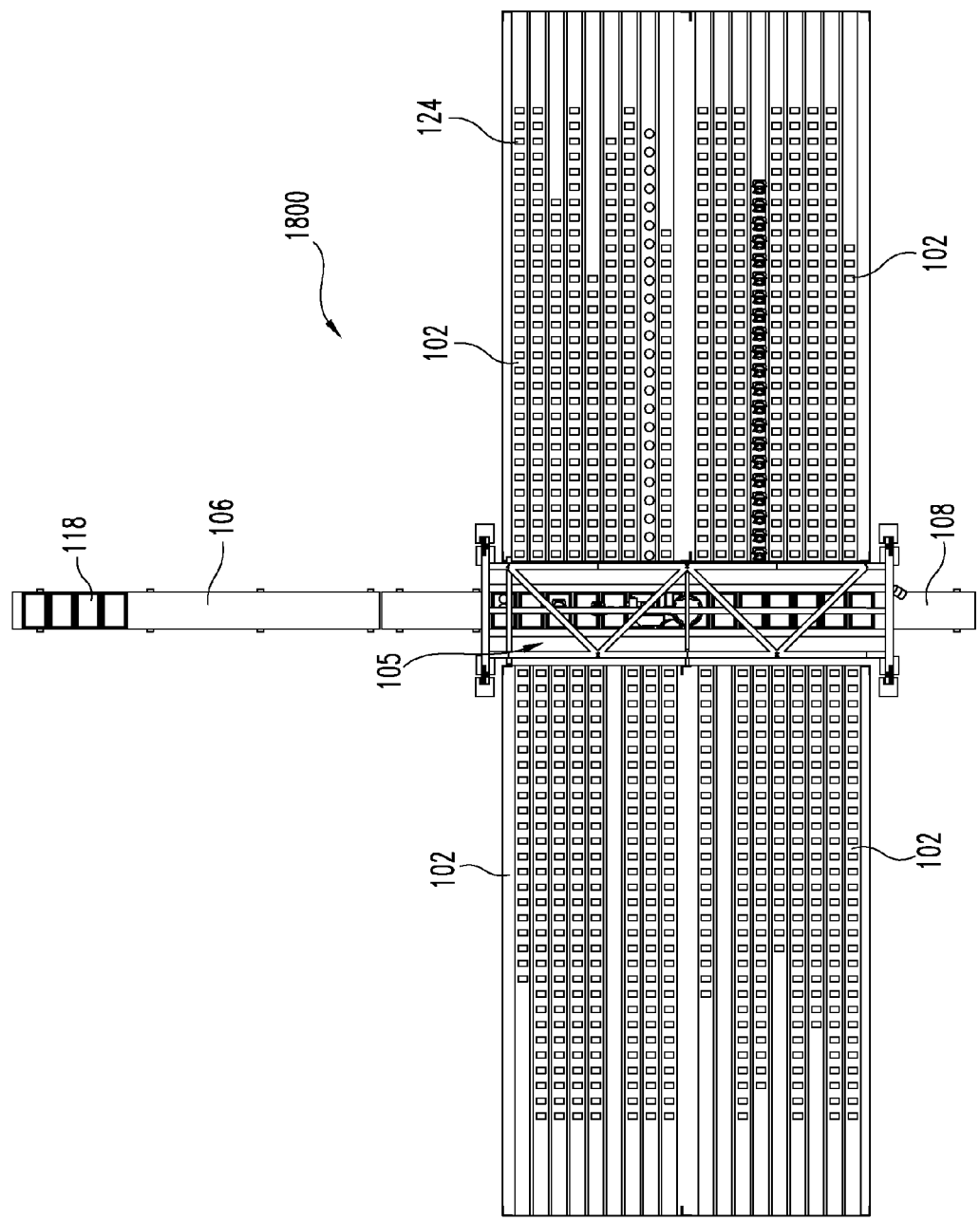
FIG. 19 is a top plan view of the FIG. 18 system.

One of the visible differences between the system 100 of FIG. 1 and the system 1800 of FIG. 18 is that the cross-belt conveyor 408 is eliminated in the system 1800 of FIG. 18. All items 120 are loaded and unloaded via the robotic arms 416. As discussed before, the robotic arms 416 can service multiple levels 122 without the need of vertically moving the robotic arms via the elevator 110. Opposing racks 102 can also be serviced with the same robotic arm 416, which in turn enhances the flexibility of the system 1800. Like the cross-belt conveyor 408, two or more items 120 can be loaded into the same tote 118 on a simultaneous or a near simultaneous basis.

Figure 21:
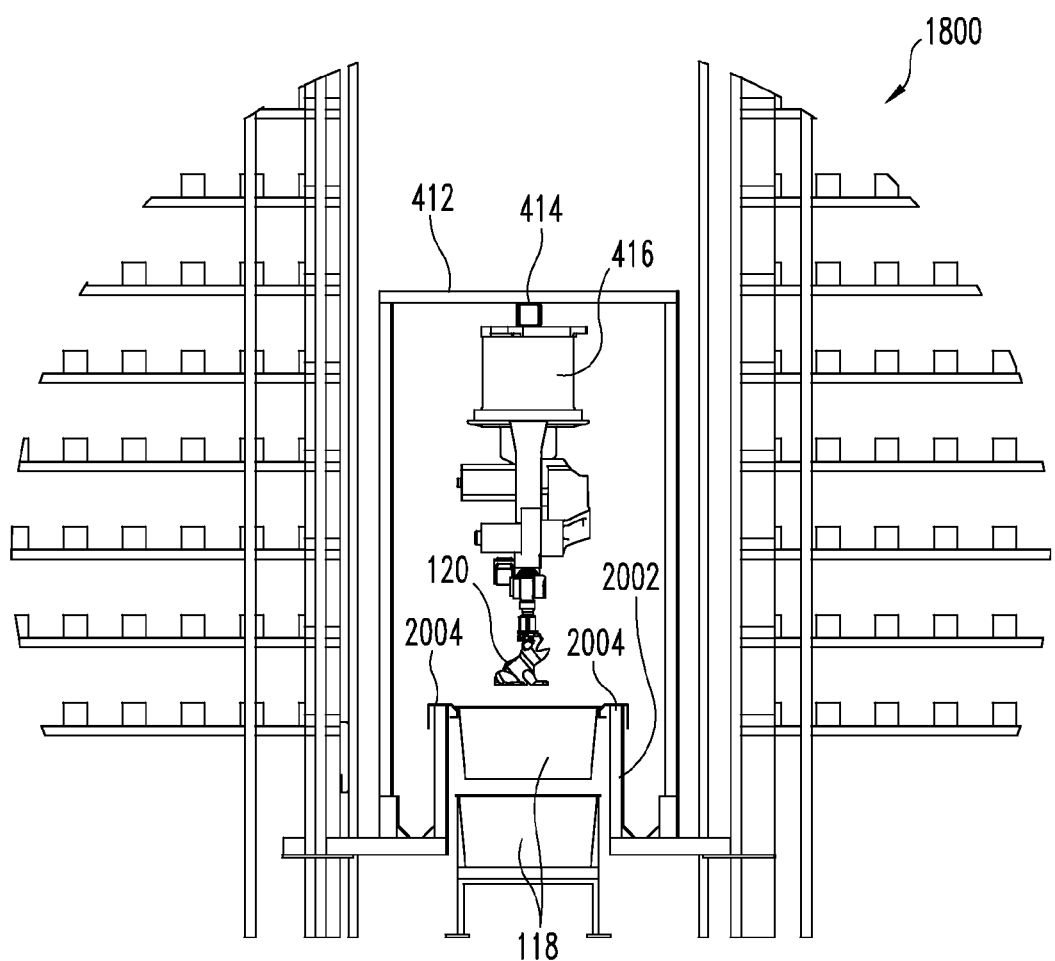
FIG. 21 is an enlarged, front-end view of the FIG. 18 system.
Figure 22:
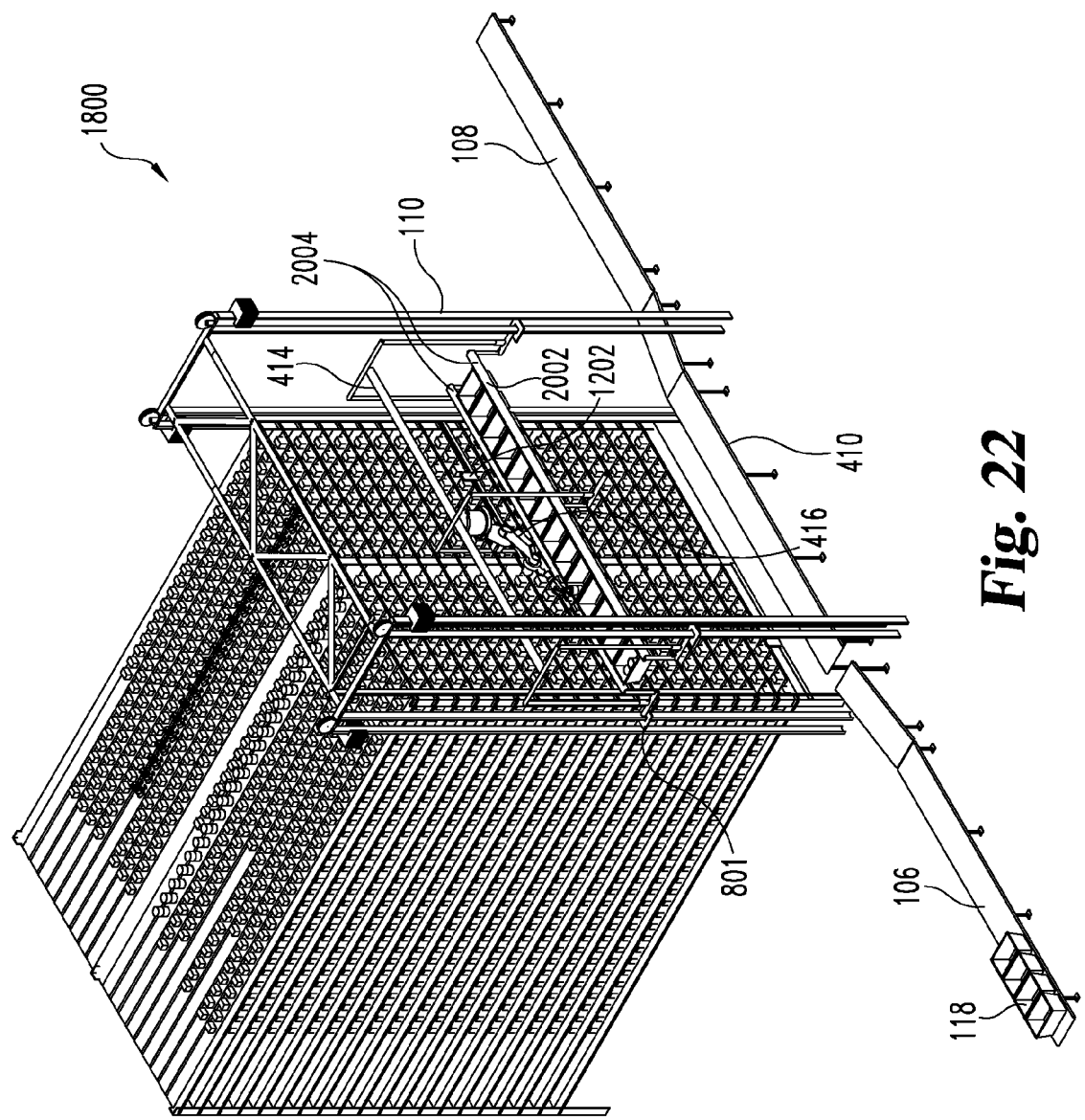
FIG. 22 is a perspective view of the FIG. 18 system.

Another distinction in the system 1800 of FIG. 18 is that when the totes 118 are lifted into the air, the transport conveyor 410 remains stationary on the ground. FIG. 21 shows an enlarged end view of the three-dimensional storage system 1800. As can be seen FIGS. 20 and 21, the system 1800 has a vertical transport or carrier 2002 with a pair of support rails 2004 that are spaced apart to engage the sides or lips of the totes 118 so that the transport 2002 is able to lift the totes 118 from the transport conveyor 410. During loading of the totes 118 onto the transport conveyor 410, the transport 2002 is lowered to a position where the rails 2004 do not interfere with the totes 118. Once the appropriate number of totes 118 are loaded, the vertical transport 2002 is raised, thereby engaging the rails 2004 with the totes 118, which in turn lifts the totes 118 from the transport conveyor 410. FIG. 22 shows a perspective view of the system 1800 when the vertical transport 2002 is lifted from the transport conveyor 410. As should be recognized, the total weight of the vertical transport 2002 is reduced by having the transport conveyor 410 remain on the ground. This in turn reduces energy consumption and facilitates the use of less expensive elevator systems. Moreover, with less weight to lift, the elevator 110 can typically operate at quicker speeds. Once all of the orders for the totes 118 are fulfilled, the vertical transport 2002 is lowered until the totes 118 rest on the transport conveyor 410. The transport conveyor 410 then unloads the totes 118 onto the outgoing conveyor 108. In another embodiment, such as for larger products or case picking, pallets may be used similarly to totes 118.

In the illustrated embodiment, the robotic arms 416 hang from a single guide rail 414, but it is contemplated that the vertical transport 2002 can have multiple guide rails upon which different robotic arms 416 move so as to avoid collisions between the robotic arms 416. As discussed previously, having the robotic arms 416 positioned in a hanging position allows the robotic arms 416 to service multiple levels while the vertical transport 2002 remains vertically stationary. In addition, such a hanging configuration is conducive for the robotic arms 416 to load or unload items 120 from multiple totes. In one particular variation, two independent robotic arms or carriers 416 are each cantilevered off one side of the vertical transport 2002. Each robotic arm 416 is able to move independently up and down the aisle between the racks 102. Collision avoidance algorithms can be implemented so as to avoid collisions between the two robots 416. In this example, one robotic arm 416 picks from the right side rack 102 and the other robotic arm 416 picks from the left side rack 102. This parallel picking technique enhances picking throughput at a given vertical level 122.

Figure 20:
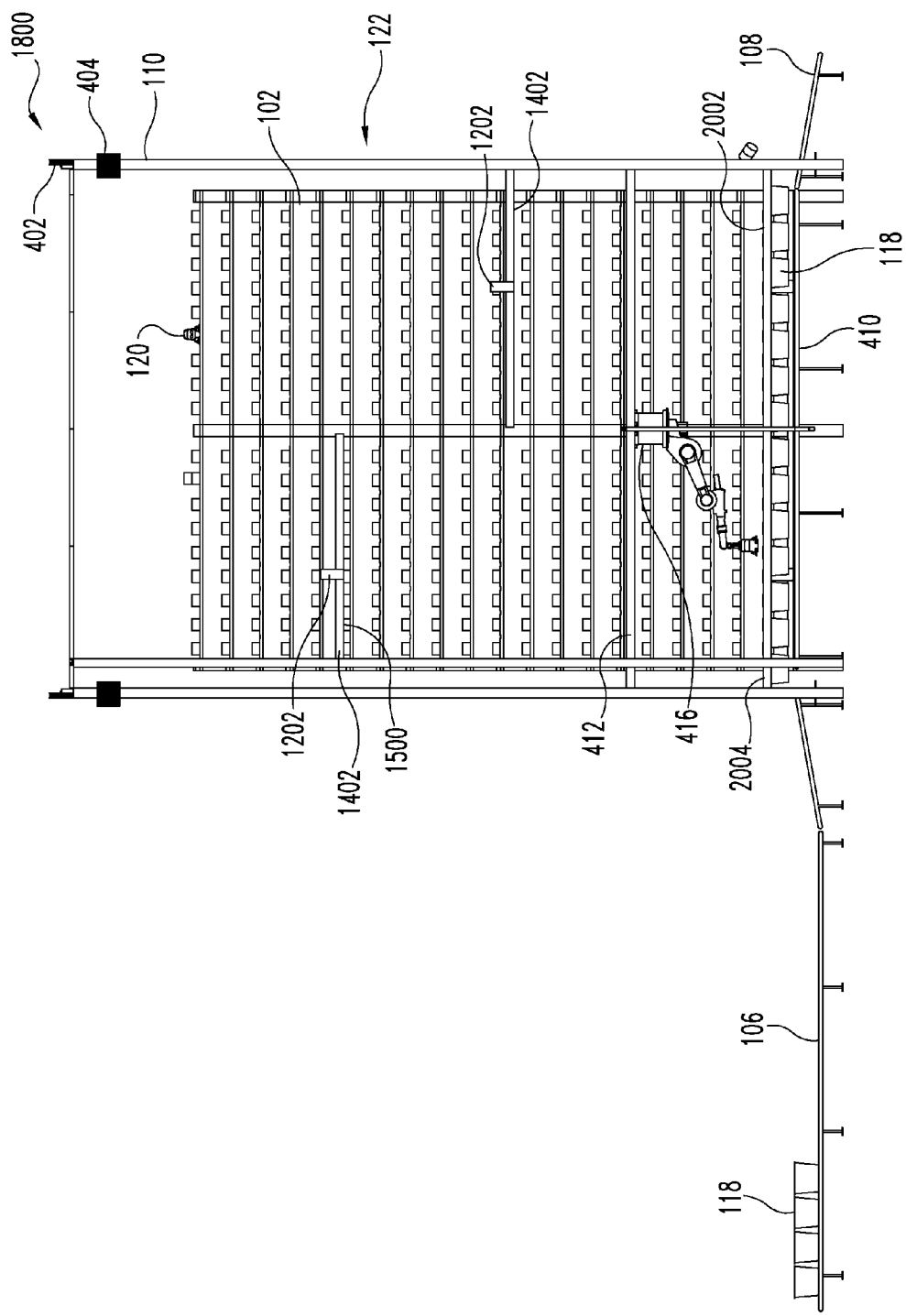
FIG. 20 is a cross-sectional view of the FIG. 18 system.

The three-dimensional storage system 1800 depicted in FIGS. 20 and 22 incorporates the conveyor drive system 1500 of FIG. 15 that allows the conveyor drivers 1202 move in a horizontal direction 1404 as well as in a vertical direction 1504 in order to power the various rack conveyors 124. In the depicted embodiment, the system 1800 has two conveyor drivers 1202 that are able to move independently of one another, but again, it should be recognized that more or less conveyor drivers 1202 can be used in other embodiments.

In an example of a typical situation, a batch of 10 to 20 orders (totes, cartons, or pallets) are inducted onto the vertical transport 2002 for fulfillment. The cartons 118 are scanned automatically and positioned into a specific "put" zone on the vertical transport 2002 in order to anchor the XY coordinates of the cartons 118. Once loaded, the vertical transport 2002 rises up to the first storage level 122 that has one or more products or items 120 to be picked. Depending on the vertical height of the storage levels 122, the robotic arm 416 can pick within a vertical band of storage levels 122 which allows less frequent vertical movement of the transport 2002. As noted before, the independently positionable conveyor driver or power supply 1202 is configured to power each individual rack-mounted conveyor 124 through mechanical, pneumatic, hydraulic, electrical, and/or other connections. In the depicted embodiment, the conveyor driver 1202 mechanically powers the rack conveyors 124. The conveyor driver 1202 can mechanically engage the rack conveyors 124 in numerous ways. For example, a male connection on the conveyor driver 1202 can engage a female connection next to drive roller of the rack conveyor 124. In this example, a bevel gear rotates the drive roller in either direction. In yet another example, a drive roller on the conveyor driver 1202 is positioned to be in direct contact with the drive roller of the rack conveyor 124. The conveyor driver 1202 in one embodiment precedes the robotic arm 416 to the next pick location and mechanically engages the rack conveyor 124 for product indexing, but in other embodiments, this order can be different. Each conveyor driver 1202 can have photo sensors to validate successful picking and indexing of items on the rack conveyor 124.

During picking, the robotic arm 416 can pick up the individual items 120 from the specified storage locations. As mentioned before, the end effector 508 of the robotic arm 416 can include a combination of mechanical gripping and vacuum technologies. The robotic end effector 508 can pick more than one product or item 120 at a time from the storage location and then put the individual product 120 into the tote or carton 118 based on the quantity each order requires. The items 120 are in general indexed individually on the rack conveyor 124 with a slight gap (1" to 2") between items 120, but in other embodiments, there can be no gap or an even greater gap between the items 120. The end effector 508 has vision controls 510 to assist in positioning the robotic arm 416 for the pick. For instance, the item 120 stored in the rack 102 could be within a tote or carton, and the robotic vision system 510 has the capability to select an individual item 120 out of the tote or carton. The design of the robotic end effector 508 will vary from one robotic pick cell to another based on the physical product spectrum to be picked. If so desired, the vision system (video feed) 510 can be visible to the system supervisor at the supervisory workstation. If there is an error condition or the robotic arm 416 is having difficulty picking an item 120, the system supervisor can semi-automatically control the end effector to pick the item 120 or correct an error condition.

Once the item 120 is picked by the robotic arm 416, the item 120 is transported and placed in the destination "order" container 118 (e.g., tote, carton, pallet, etc.). The robotic arm 416 has the capability to place the item 120 in a specific physical configuration within the container 118 to most effectively "pack out" the tote or carton or "palletize" the pallet. The conveyor driver 1202 indexes the rack conveyor 124 in the storage location where the item 120 was just picked so that the next individual item 120 is moved into the "pick" position of the rack conveyor 124. Photo sensors on the conveyor driver 1202 and/or the rack 102 can confirm item positioning. The pick process is repeated at the current vertical level 122 until all picks within the vertical range or band of the robotic arm 416 have been completed for the batch of orders. The vertical transport 2002 then is raised to the next vertical band of the rack 102 that has required picks. The picking process is then repeated. When all picks are complete, the vertical transport 2002 is then lowered to the home position (all the way down), and the orders are released to the next robotic pick module or zone. A new batch of orders is then inducted into the vertical transport 2002, and the complete picking cycle is repeated.

Figure 23:
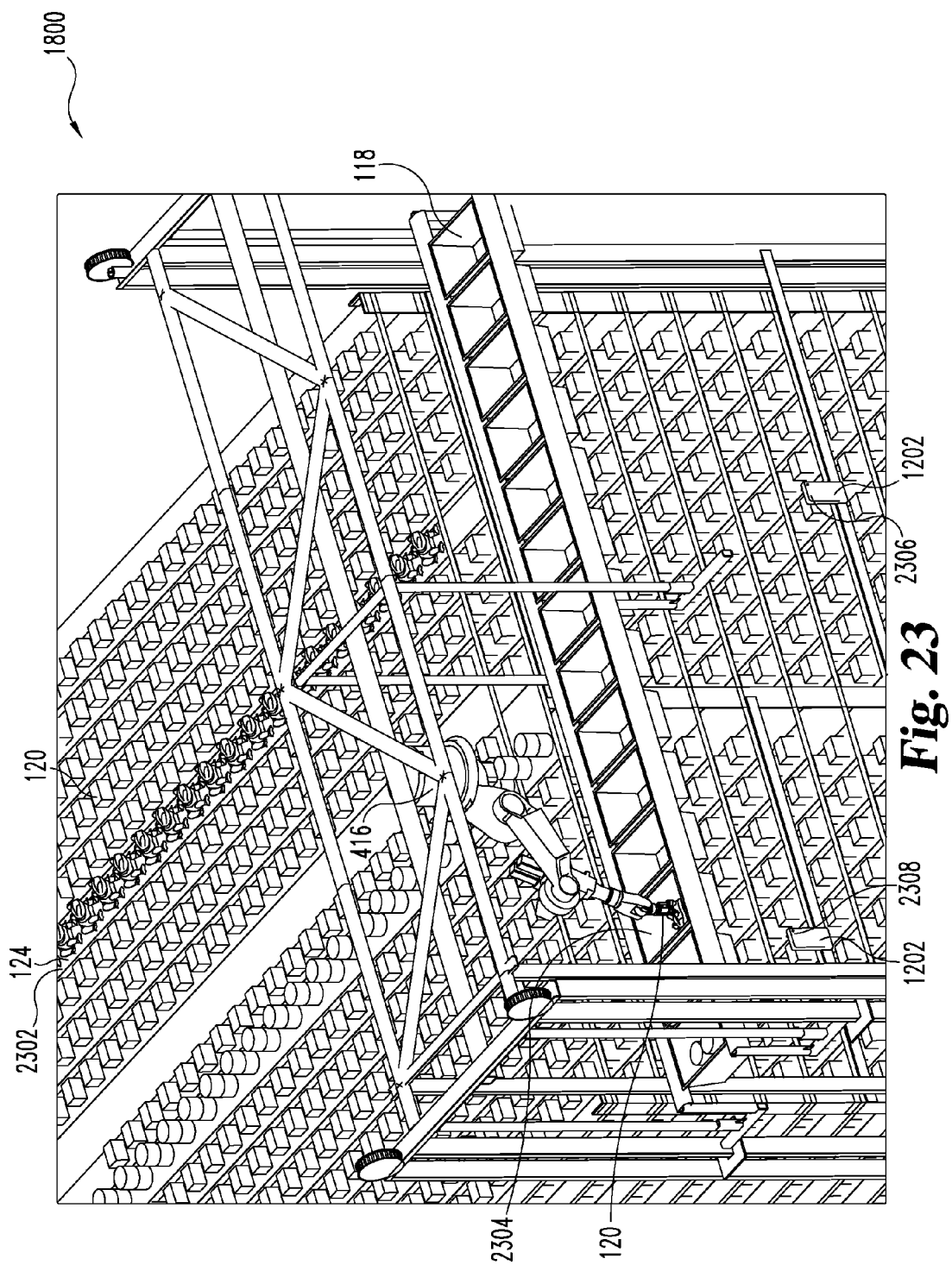
FIGS. 23, 24, 25, and 26 are partial, perspective views of the FIG. 18 system that illustrate various stages of a loading sequence.
Figure 24:
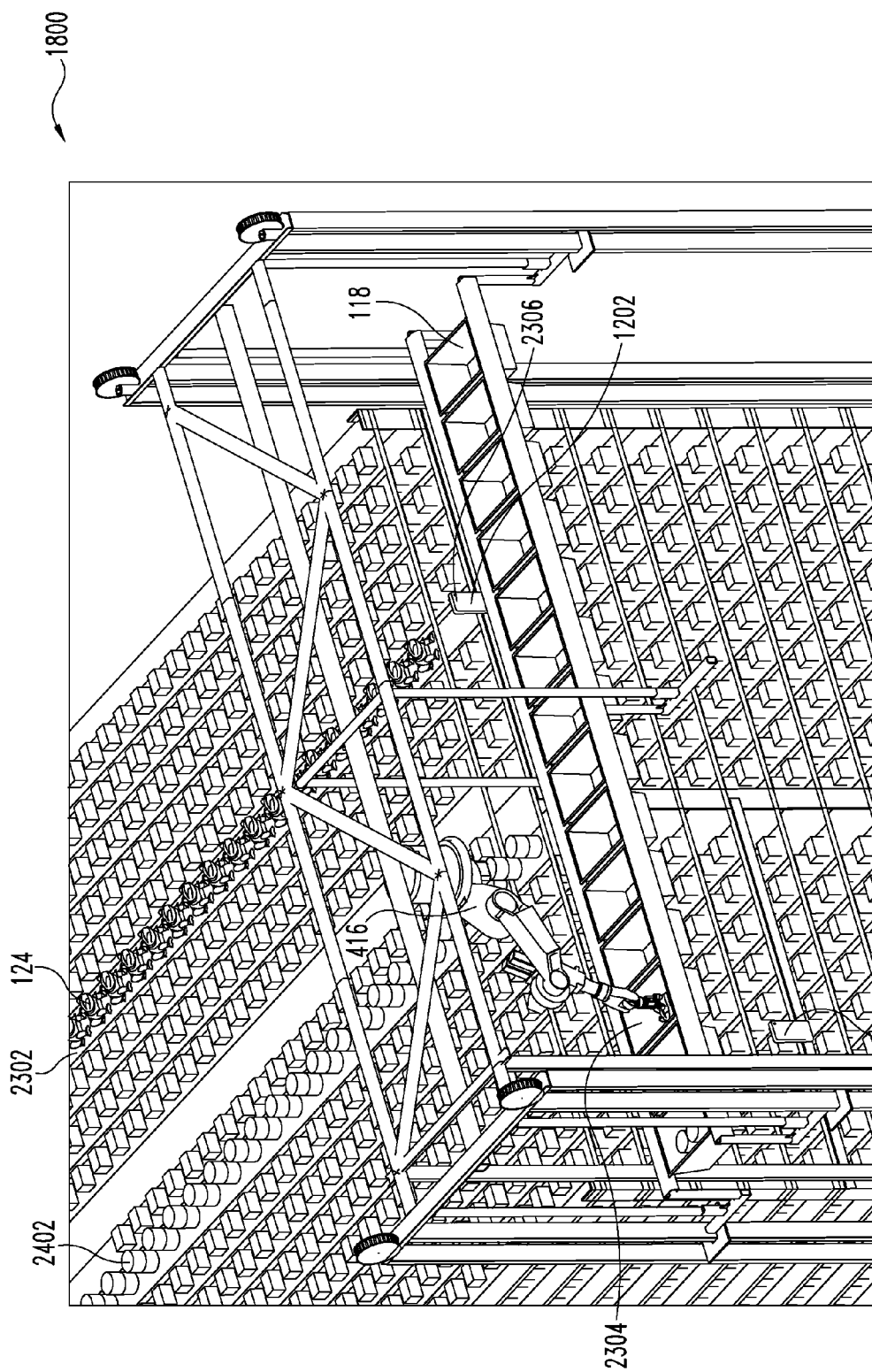
Figure 25:
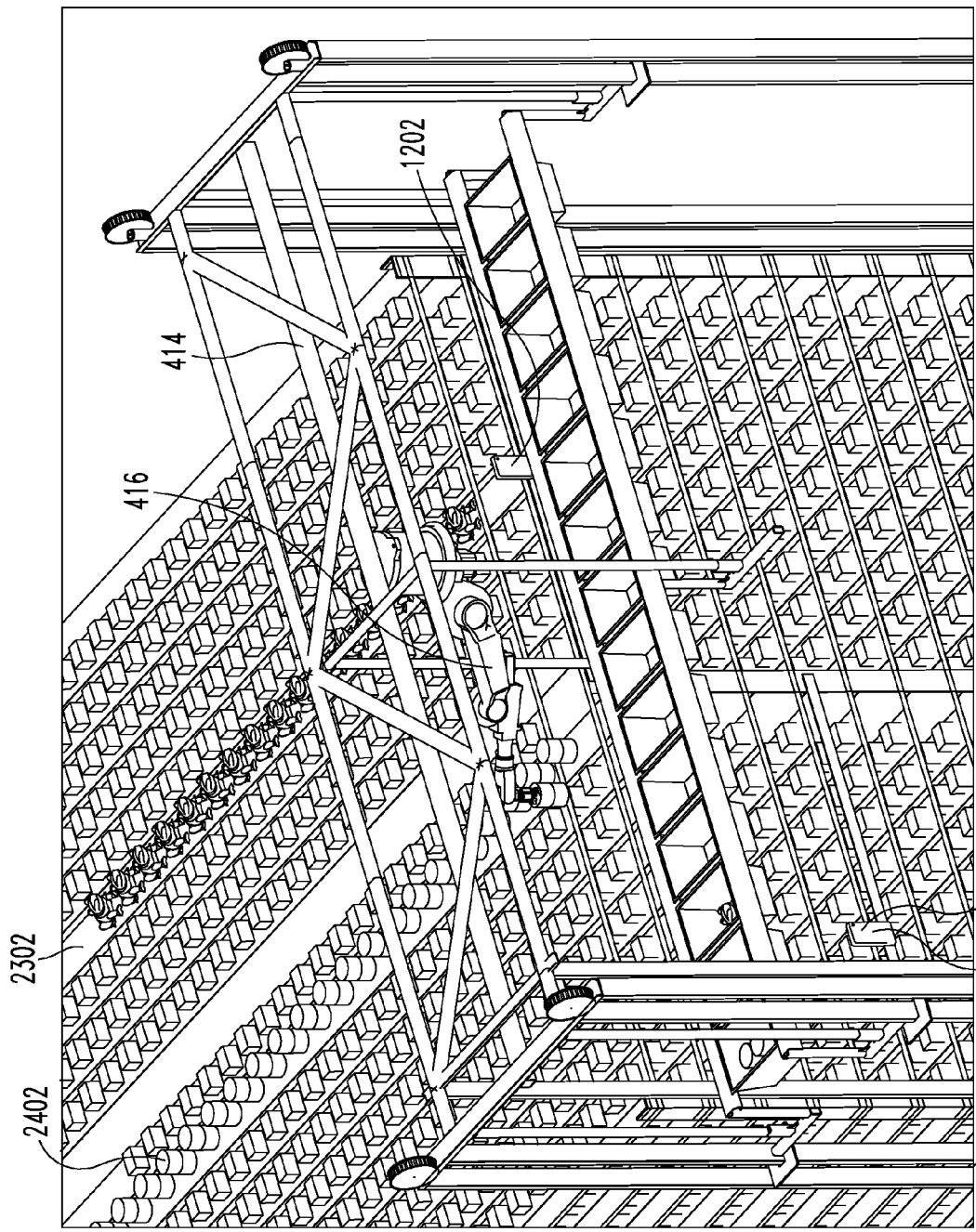
Figure 26:
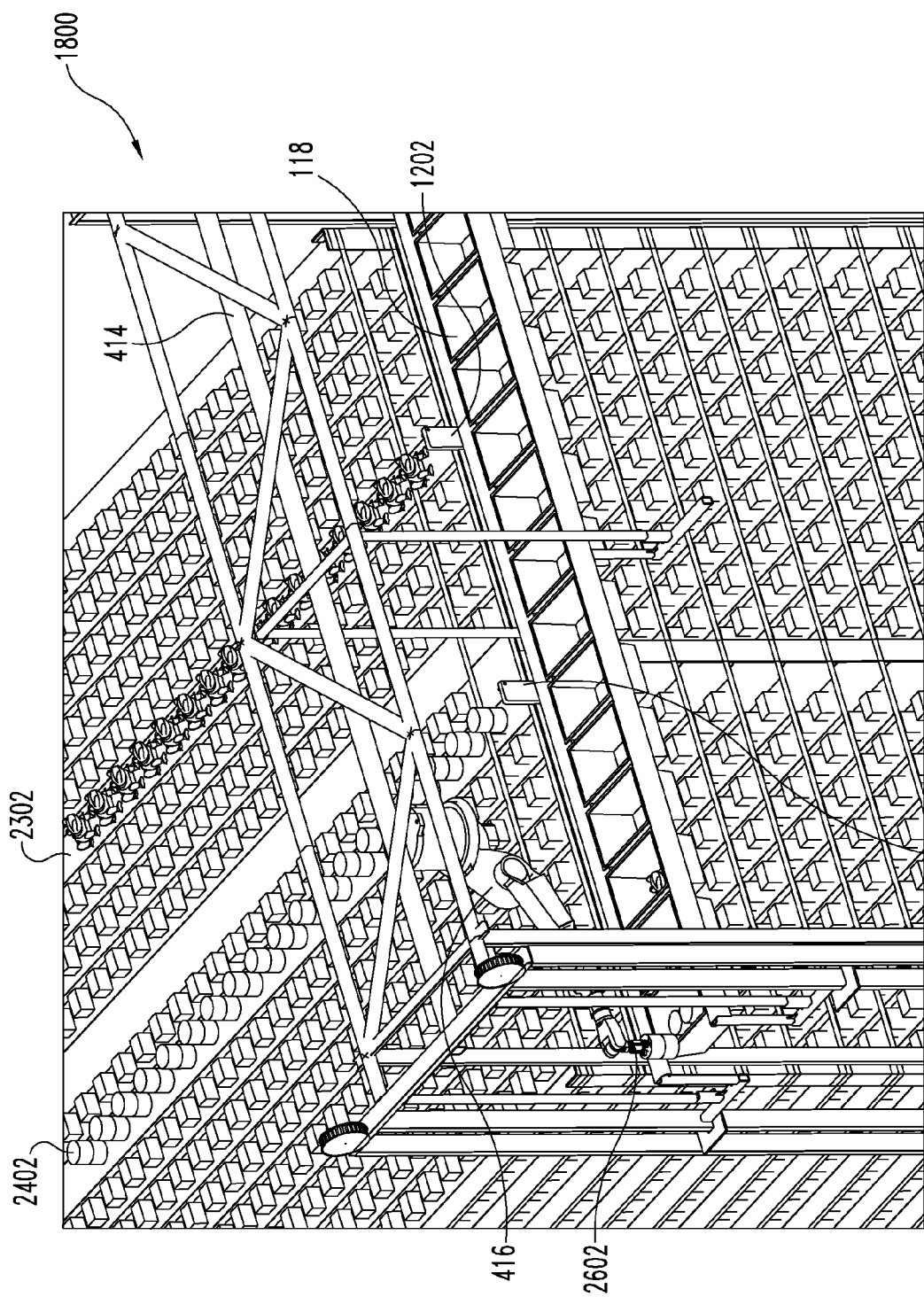

FIGS. 23, 24, 25, and 26 illustrate a specific example of how items 120 are loaded from the racks 102 and into the totes 118 with the depicted system 1800. Turning to FIG. 23, the robotic arm 416 in this example unloaded a first item 120 from a rack conveyor 124, which is indicated by reference number 2302, and in FIG. 23, the robotic arm 416 is in the process of depositing the first item into a receiving tote 118, as is designated by reference number 2304. Again, in the depicted embodiment, the system 1800 has two conveyor drivers 1202, a first conveyor driver 2306, and a second conveyor driver 2308. Once the first item 120 is unloaded from rack conveyor 2302, the first conveyor driver 2306 travels up to the emptied rack conveyor 2302 in order to index the next item 120 into position, as is depicted in FIG. 24. Meanwhile, the robotic arm 416 unloads the item 120 into the receiving tote 2304. It should be recognized that the robotic arm 416 can ensure that the item 120 is placed safely into the tote 2304 so as to avoid any damage created by other loading techniques, such as by dropping the item 120. Moving independently of the first conveyor driver 2306, the second conveyor driver 2308 in FIG. 24 starts to move the next or second rack conveyor 124 (indicated by reference numeral 2402) that needs to be indexed, even before an item 120 is removed. Looking at FIG. 25, the second conveyor driver 2308 continues to travel to the second rack conveyor 2402 while the robotic arm 416 removes an item 120 from the second rack conveyor 2402. After retrieving the item 120, the robotic arm 416 travels along the guide rail 414 to the next tote 118, which is indicated by reference numeral 2602 in FIG. 26. The robotic arm 416 deposits the item 120 into the tote 2602, and at the same time, the second conveyor driver 2308 indexes the second rack conveyor 2402 so that the next item 120 is available. The process continues until the requisite orders are fulfilled. It should be appreciated that the above discussion is merely one example of how items 120 can be loaded into the totes 118 with the system 1800. Items 120 can be loaded or unloaded in other manners as well.

Figure 28:
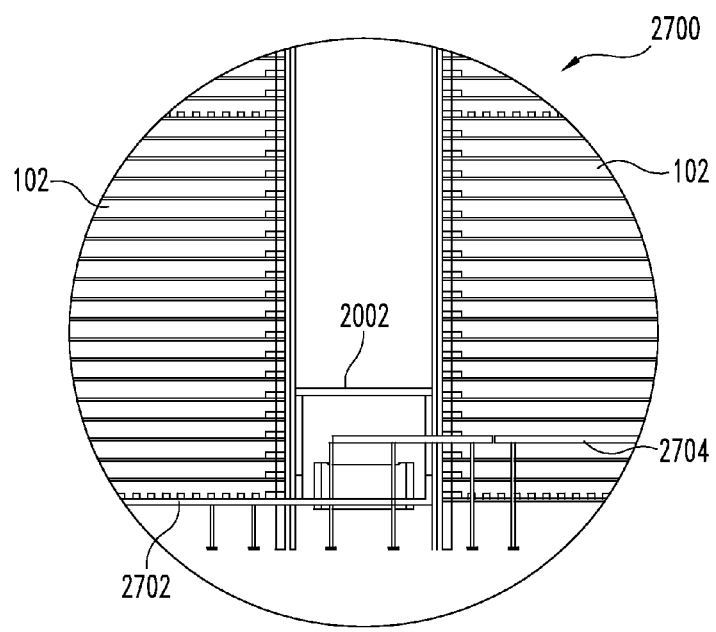
FIG. 28 is an enlarged front-end view of the FIG. 27 system.

FIG. 27 illustrates a top view of a three-dimensional storage system 2700 according to still yet another embodiment. The system 2700 in FIG. 27 is configured in the same manner as described above, with the exception that its incoming 2702 and outgoing 2704 conveyors are located on the same side of the racks 102. This particular conveyor layout can be used in numerous situations. For example, the conveyor layout in the system 2700 of FIG. 27 can be used when space is a concern and/or having the conveyors in an inline configuration is not desirable or practical. To prevent interference between the conveyors, the incoming 2702 and outgoing 2704 conveyors are vertically spaced from one another, as is depicted in FIG. 28. As shown, the incoming conveyor 2702 is positioned underneath the outgoing conveyor 2704 near the entrance of the racks 102. In this example, the transport conveyor 410 can be raised so as to unload the totes 418 onto the outgoing conveyor 2704. Nevertheless, it should be appreciated that the conveyors can be oriented differently in other embodiments.

Figure 29:
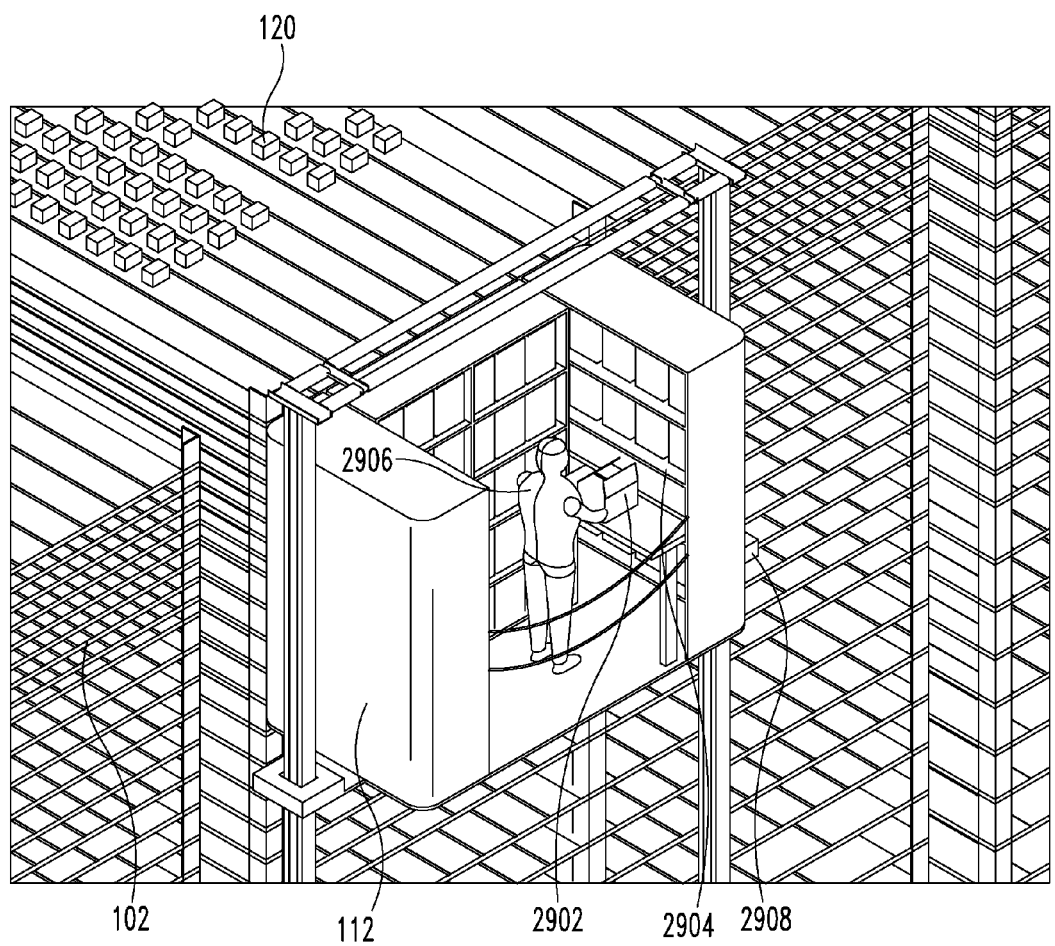
FIG. 29 is an enlarged perspective view of a replenishment station in the FIG. 1 system.

With the above-described systems, items 120 can be replenished on the racks 102 in a number of ways, such as manually via a human operator, automatically, or some combination thereof. Returning to FIG. 1, the replenishment station 112 can be used to manually replenish items 120 on the racks 102. Replenishment can occur in a number of manners, such as using a First In First Out (FIFO) technique or a Last In First Out (LIFO) technique. FIG. 29 provides an enlarged view of the replenishment station 112 first illustrated in FIG. 1. Although the replenishment station 112 has been illustrated in conjunction with the system 100 of FIG. 1, it should be recognized that the replenishment station 112 can be incorporated into other systems as well, such as the ones illustrated in FIGS. 18 and 27.

An example of a manual First In First Out replenishment sequence that utilizes the replenishment station 112 will be described with reference to FIG. 29. It should be recognized that this technique along with the replenishment station can be adapted for use in other systems. In this example, a batch of 12 to 20 replenishment cartons 2902 (by specific SKU) are placed on shelves 2904 in the replenishment station 112. As can be seen in FIG. 29, the replenishment station 112 is located on the outside of the racks 102. During replenishment, the replenishment station 112 automatically (or manually) moves to each put-away location. A replenishment operator 2906 takes individual items 120 out of the designated carton and places the items on a replenishment induction belt conveyor 2908 (within the replenishment station 112). The required spacing or gapping of the items 120 on the induction belt 2908 is shown to the operator with lights. In this example, a conveyor driver 1202 mounted to the replenishment station 112 engages with each rack conveyor 124 to index the replenishment items 120 onto the rack conveyor 124. By having conveyor driver 1202 on the replenishment station 112, the picking process can proceed in parallel with the replenishment process (with the exception of the specific conveyor lane that is being replenished). It is envisioned that in other variations the same conveyor drivers 1202 that are used to index the conveyors for the picking process can be used for the replenishment cycle as well. When the induction conveyor belt 2908 is in full view of items 120 within the replenishment station 112, the replenishment operator 2906 presses an advance button, and the induction belt 2908 advances to deposit the items 120 onto the rack conveyor 124. This process is repeated at the same storage location until the rack conveyor 124 is full of items 120 or "topped off" based on the appropriate replenishment inventory algorithm. The replenishment station 112 then moves to the next replenishment "put-away" location, and the process is repeated. When all replenishment items 120 have been put away, the replenishment station 112 returns to the home position to discard any empty corrugated cartons and then restocks new replenishment cartons of items 120 that need to be put away. The complete replenishment cycle is then repeated. It should be recognized that the replenishment station 112 in other embodiments can be automated in order to eliminate the need for a human operator.

An automated replenishment technique that uses Last In First Out sequence will now be described with reference to FIGS. 18-20. With this technique, replenishment cartons 118 of items 120 can be mixed with the batch of orders to be picked. In other words, the replenishment process is interleaved with the picking process. Typically, after each vertical movement of the vertical transport 2002, the robotic arm 416 sequentially picks individual items 120 out of the replenishment cartons 118 and places the items onto the rack conveyor 124. Once all replenishments are completed, the robotic arm 416 goes through the pick cycle for orders to be fulfilled. This replenishment technique allows the use of the same robotics for both picking and replenishment and is completely automated.

With the above described systems, picking (or replenishment) of up to 4 to 5 times the picking rates of human operators can be achieved with near 100% picking accuracy. Operating costs can be reduced due to the elimination of human pickers. Unlike prior systems, fragile products can be handled without damage because the robots 416 are able to place the items 120 within the tote or carton 118 rather than being dumped. Moreover, human operators are not subjected to undesirable environments like coolers, freezers, etc. The above-described automated systems also provide the ability to have consistent throughput to synchronize upstream and downstream operations, and it can maintain high picking throughput 24 hours a day, 7 days a week. This system additionally is able to pick individual products in a wide variety of units of measures, such as an individual unit (sometimes referred to as "eaches"), inner packs, and/or full cases. Likewise, the storage racks (or matrix) 102 can be sized for various units of measure like individual units, inner packs, full cases, etc.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A storage system, comprising:
at least two storage racks disposed in an opposing manner, the storage racks each including two or more levels that have one or more rack conveyors, wherein the rack conveyors are configured to store items;
a vertical transport disposed between the storage racks, the vertical transport including one or more robotic arms being secured to the vertical transport to move vertically in unison with the vertical transport, the vertical transport having one or more loading areas, the robot arms being configured to load items from the racks onto the loading areas of the vertical transport;
an elevator configured to move the vertical transport vertically between the levels so that the robotic arms are able to load the items from the rack conveyors onto the loading areas of the vertical transport, wherein the loading areas move vertically with vertical transport when the elevator vertically moves the vertical transport;
wherein the vertical transport has one or more guide rails upon which the robotic arms hang, wherein the guide rails extend above the loading areas in a longitudinal direction between the racks;
wherein the robotic arms are configured to move longitudinally above the loading areas along the guide rails for loading items along the length of the vertical transport; and
wherein the robotic arms include an inverted six axis robot.

2. The system of claim 1, further comprising:
wherein the rack conveyors are unpowered; and
a conveyor driver configured to move to power two or more of the rack conveyors.

3. The system of claim 2, wherein the conveyor driver is configured to move horizontally along one of the levels.

4. The system of claim 2, wherein the conveyor driver is configured to move vertically between the levels for indexing rack conveyors on different levels so that the robotic arms are able to load the items from the rack conveyors on different levels while the vertical transport remains vertically stationary.

5. The system of claim 2, wherein the conveyor driver is secured to the vertical transport.

6. The system of claim 2, where in the conveyor driver is secured to one of the racks.

7. The system of claim 1, wherein the vertical spacing between the levels in the racks decreases at higher levels.

8. The system of claim 1, wherein:
the vertical transport includes a cross-belt conveyor configured to load the items from the rack conveyors onto the vertical transport; and
the cross-belt conveyor being secured to the vertical transport to move vertically in unison with the vertical transport.

9. The system of claim 1, further comprising a transport conveyor configured to unload the items from the vertical transport.

10. The system of claim 9, wherein the transport conveyor is secured to the vertical transport to move vertically in unison with the vertical transport.

11. The system of claim 9, wherein:
the loading areas of the vertical transport includes two or more rails that are spaced apart to hold one or more containers in which the items are loaded; and
the vertical transport is configured to lift the containers from the transport conveyor during loading.

12. The system of claim 1, further comprising:
an incoming conveyor configured to load containers onto the vertical transport; and
an outgoing conveyor configured to unload the containers from the vertical transport.

13. The system of claim 10, wherein the incoming conveyor and the outgoing conveyor are disposed at the same end of the vertical transport.

14. The system of claim 1, further comprising a replenishment station configured to move vertically and horizontally along at least one of the racks for replenishing items on the rack conveyors.

15. A storage system, comprising:
at least two storage racks disposed in an opposing manner, the storage racks each including two or more levels that have one or more rack conveyors upon which items are stored;
a vertical transport disposed between the storage racks, the vertical transport including a cross-belt conveyor configured to load the items from the rack conveyors onto the vertical transport, the cross-belt conveyor including one or more carriages horizontally moveable in a travel direction along the one or more rack conveyors, and each of the one or more carriages having a powered belt mounted generally perpendicular to the travel direction so that items moved with the powered belt move generally perpendicular to the travel direction of the carriage; and
an elevator configured to move the vertical transport vertically between the levels.

16. The system of claim 15, wherein the cross-belt conveyor is secured to the vertical transport to move vertically in unison with the vertical transport.

17. The system of claim 15, wherein the cross-belt conveyor is looped around the vertical transport to load the items from the at least two storage racks simultaneously.

18. A storage system, comprising:
a storage rack including two or more levels that have one or more rack conveyors, wherein the rack conveyors are configured to store items
a cross-belt conveyor located along a side of the storage rack for transporting the items, the cross-belt conveyor including
one or more carriages horizontally moveable in a travel direction along the one or more rack conveyors, and
each of the one or more carriages having a powered belt mounted generally perpendicular to the travel direction to move the items generally perpendicular to the travel direction of the carriage; and
an elevator coupled to the cross-belt conveyor to move the cross-belt conveyor vertically between the levels of the storage rack.

19. The storage system of claim 18, further comprising:
one or more transport locations on the elevator where the cross-belt conveyor loads or unloads the items from the storage rack.

20. The storage system of claim 19, in which the one or more transport locations have one or more totes.

21. The storage system of claim 19, in which the one or more transport locations have one or more pallets.

22. The storage system of claim 19, further comprising:
a transport conveyor on which the one or more transport locations are located.

23. The storage system of claim 18, further comprising:
a plurality of chutes to which the cross-belt conveyor loads items from storage rack.

24. The storage system of claim 23, in which each of the chutes include a slide ramp.

25. The storage system of claim 24, in which the chutes include a plurality of standoffs that define the chutes.

26. The storage system of claim 18, further comprising:
a second storage rack, wherein both storage racks face each other in an opposing manner with the cross-belt conveyor disposed in between; and
the cross-belt conveyor is in the form of a loop between the storage racks.

27. The storage system of claim 18, further comprising:
a robotic arm coupled to the elevator.

28. A method, comprising:
loading a first item from a first rack conveyor at a first rack level onto a cross-belt conveyor;
moving the item in a lateral direction that is transverse to the first rack conveyor with the cross-belt conveyor;
depositing the first item from the cross-belt conveyor at a loading area that is offset in the lateral direction from the first rack conveyor;
moving the cross-belt conveyor in a vertical direction to a second rack level that is offset in the vertical direction from the first rack level;
loading a second item from the second rack level onto the cross-belt conveyor;
wherein the cross-belt conveyor includes one or more carriages moveable in the lateral direction and each of the one or more carriages having a powered belt mounted generally perpendicular to the lateral direction; and
wherein said loading the first item includes powering the powered belt to move the first item in a direction that is transverse to the lateral direction.

29. The method of claim 28, further comprising:
wherein said moving the cross-belt conveyor in the vertical direction includes moving the cross-belt conveyor up; and
wherein said depositing the first item from the cross-belt conveyor at the loading area includes loading the item into a tote.

30. The method of claim 28, further comprising:
wherein the loading area is incorporated with the cross-belt conveyor; and
wherein said moving the cross-belt conveyor in the vertical direction include moving the loading area in the vertical direction along with the cross-belt conveyor.

31. A storage system, comprising:
at least two storage racks disposed in an opposing manner, the storage racks each including two or more levels that have one or more rack conveyors, wherein the rack conveyors are configured to store items;
a vertical transport disposed between the storage racks, the vertical transport including one or more robotic arms being secured to the vertical transport to move vertically in unison with the vertical transport, the vertical transport having one or more loading areas, the robot arms being configured to load items from the racks onto the loading areas of the vertical transport;
an elevator configured to move the vertical transport vertically between the levels so that the robotic arms are able to load the items from the rack conveyors onto the loading areas of the vertical transport, wherein the loading areas move vertically with vertical transport when the elevator vertically moves the vertical transport;
wherein the vertical transport has one or more guide rails upon which the robotic arms hang, wherein the guide rails extend above the loading areas in a longitudinal direction between the racks;
wherein the robotic arms are configured to move longitudinally above the loading areas along the guide rails for loading items along the length of the vertical transport;
wherein the rack conveyors are unpowered;
a conveyor driver configured to move to power two or more of the rack conveyors; and
wherein the conveyor driver is configured to move horizontally along one of the levels.

32. A storage system, comprising:
at least two storage racks disposed in an opposing manner, the storage racks each including two or more levels that have one or more rack conveyors, wherein the rack conveyors are configured to store items;
a vertical transport disposed between the storage racks, the vertical transport including one or more robotic arms being secured to the vertical transport to move vertically in unison with the vertical transport, the vertical transport having one or more loading areas, the robot arms being configured to load items from the racks onto the loading areas of the vertical transport;
an elevator configured to move the vertical transport vertically between the levels so that the robotic arms are able to load the items from the rack conveyors onto the loading areas of the vertical transport, wherein the loading areas move vertically with vertical transport when the elevator vertically moves the vertical transport;
wherein the vertical transport has one or more guide rails upon which the robotic arms hang, wherein the guide rails extend above the loading areas in a longitudinal direction between the racks;
wherein the robotic arms are configured to move longitudinally above the loading areas along the guide rails for loading items along the length of the vertical transport;
wherein the rack conveyors are unpowered;
a conveyor driver configured to move to power two or more of the rack conveyors; and
wherein the conveyor driver is configured to move vertically between the levels for indexing rack conveyors on different levels so that the robotic arms are able to load the items from the rack conveyors on different levels while the vertical transport remains vertically stationary.

33. A storage system, comprising:
at least two storage racks disposed in an opposing manner, the storage racks each including two or more levels that have one or more rack conveyors, wherein the rack conveyors are configured to store items;
a vertical transport disposed between the storage racks, the vertical transport including one or more robotic arms being secured to the vertical transport to move vertically in unison with the vertical transport, the vertical transport having one or more loading areas, the robot arms being configured to load items from the racks onto the loading areas of the vertical transport;

an elevator configured to move the vertical transport vertically between the levels so that the robotic arms are able to load the items from the rack conveyors onto the loading areas of the vertical transport, wherein the loading areas move vertically with vertical transport when the elevator vertically moves the vertical transport;

wherein the vertical transport has one or more guide rails upon which the robotic arms hang, wherein the guide rails extend above the loading areas in a longitudinal direction between the racks;

wherein the robotic arms are configured to move longitudinally above the loading areas along the guide rails for loading items along the length of the vertical transport;

wherein the rack conveyors are unpowered;

a conveyor driver configured to move to power two or more of the rack conveyors; and wherein the conveyor driver is secured to the vertical transport.

* * * * *